US011838418B2

(12) United States Patent
Girkar et al.

(10) Patent No.: US 11,838,418 B2
(45) Date of Patent: **\*Dec. 5, 2023**

(54) PROTECTION OF KEYS AND SENSITIVE DATA FROM ATTACK WITHIN MICROPROCESSOR ARCHITECTURE

(71) Applicant: Intel Corporation, Santa Clara, CA (US)

(72) Inventors: Milind Girkar, Sunnyvale, CA (US); Jason W. Brandt, Austin, TX (US); Michael LeMay, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 483 days.

This patent is subject to a terminal disclaimer.

(21) Appl. No.: 16/998,913

(22) Filed: Aug. 20, 2020

(65) Prior Publication Data
US 2020/0382303 A1 Dec. 3, 2020

Related U.S. Application Data

(63) Continuation of application No. 16/024,259, filed on Jun. 29, 2018, now Pat. No. 10,785,028.

(51) Int. Cl.
*G06F 21/00* (2013.01)
*H04L 9/32* (2006.01)
(Continued)

(52) U.S. Cl.
CPC .......... *H04L 9/3213* (2013.01); *G06F 21/602* (2013.01); *H04L 9/0861* (2013.01)

(58) Field of Classification Search
CPC .... H04L 9/3213; H04L 9/0861; G06F 21/602
(Continued)

(56) References Cited

U.S. PATENT DOCUMENTS 9,015,824 B1 * 4/2015 Drewry ..................... H04L 9/32
726/6
9,135,450 B2 * 9/2015 Grobman .............. H04L 9/0822
(Continued)

OTHER PUBLICATIONS

Carr, S., et al. "DataShield: Configurable Data Confidentiality and Integrity," ACM, ASIA CCS '17, Abu Dhabi, United Arab Emirates, 12 pages, Apr. 2-6, 2017.‡
(Continued)

*Primary Examiner* — Shin-Hon (Eric) Chen
(74) *Attorney, Agent, or Firm* — NICHOLSON DE VOS WEBSTER & ELLIOTT, LLP

(57) ABSTRACT

A processor core that includes a token generator circuit is to execute a first instruction in response to initialization of a software program that requests access to protected data output by a cryptographic operation. To execute the first instruction, the processor core is to: retrieve a key that is to be used by the cryptographic operation; trigger the token generator circuit to generate an authorization token; cryptographically encode the key and the authorization token within a key handle; store the key handle in memory; and embed the authorization token within a cryptographic instruction that is to perform the cryptographic operation. The cryptographic instruction may be associated with a first logical compartment of the software program that is authorized access to the protected data.

17 Claims, 17 Drawing Sheets

(51) Int. Cl.
*H04L 9/08* (2006.01)
*G06F 21/60* (2013.01)

(58) Field of Classification Search
USPC .......................................................... 713/193
See application file for complete search history.

(56) References Cited

U.S. PATENT DOCUMENTS

| | | | | |
|---|---|---|---|---|
| 9,390,268 B1* | 7/2016 | Martini | ............... | H04L 63/1416 |
| 10,785,028 B2* | 9/2020 | Girkar | ................... | H04L 9/0891 |
| 2005/0010804 A1* | 1/2005 | Bruening | ................ | G06F 21/52 |
| | | | | 726/1 |
| 2007/0220500 A1* | 9/2007 | Saunier | ................ | G06F 21/575 |
| | | | | 717/162 |
| 2008/0205651 A1* | 8/2008 | Goto | ........................ | H04L 9/302 |
| | | | | 713/189 |
| 2008/0229425 A1* | 9/2008 | Perrin | ..................... | G06F 21/71 |
| | | | | 726/26 |
| 2008/0320601 A1* | 12/2008 | Linsley | ................. | G06F 21/125 |
| | | | | 726/28 |
| 2009/0249064 A1* | 10/2009 | De Atley | ................ | G06F 21/51 |
| | | | | 713/176 |
| 2010/0122088 A1* | 5/2010 | Oxford | ............... | H04L 63/0478 |
| | | | | 380/278 |
| 2013/0283396 A1* | 10/2013 | Langer | .................. | G06F 21/121 |
| | | | | 726/28 |
| 2014/0020092 A1* | 1/2014 | Davidov | ................. | G06F 21/54 |
| | | | | 726/22 |
| 2014/0149730 A1* | 5/2014 | Joshi | ..................... | G06F 21/572 |
| | | | | 713/2 |
| 2015/0032996 A1* | 1/2015 | Koeberl | ................ | G06F 9/3802 |
| | | | | 712/205 |
| 2015/0381358 A1‡ | 12/2015 | Grobman | .............. | H04L 9/0877 |
| | | | | 713/18 |
| 2016/0380772 A1‡ | 12/2016 | Gopal | ...................... | G09C 1/00 |
| | | | | 713/17 |
| 2017/0063547 A1‡ | 3/2017 | Brandt | .................... | G06F 21/53 |
| 2017/0093567 A1‡ | 3/2017 | Gopal | ................... | H04L 9/3236 |
| 2017/0235957 A1* | 8/2017 | Maletsky | ............ | H04L 63/0807 |
| | | | | 713/168 |
| 2018/0082057 A1* | 3/2018 | LeMay | ................... | G06F 21/54 |
| 2018/0268170 A1* | 9/2018 | Li | ........................ | G06F 21/6281 |
| 2019/0377574 A1* | 12/2019 | Weimer | ................ | G06F 9/3004 |

OTHER PUBLICATIONS

Hong, H. et al., "Data-Oriented Programming: On the Expressiveness of Non-Control Data Attacks," IEEE S&P, 18 pages, 2016.‡
Carlini, N. et al., "Control-Flow Bending: On the Effectiveness of Control-Flow Integrity," Usenix the Advanced Computing Systems Association, 24th USENIX Security Symposium, Washington, D.C., 17 pages, Aug. 12-14, 2015.‡
Notice of Allowance, U.S. Appl. No. 16/024,259, dated May 20, 2020, 20 pages.

* cited by examiner
‡ imported from a related application

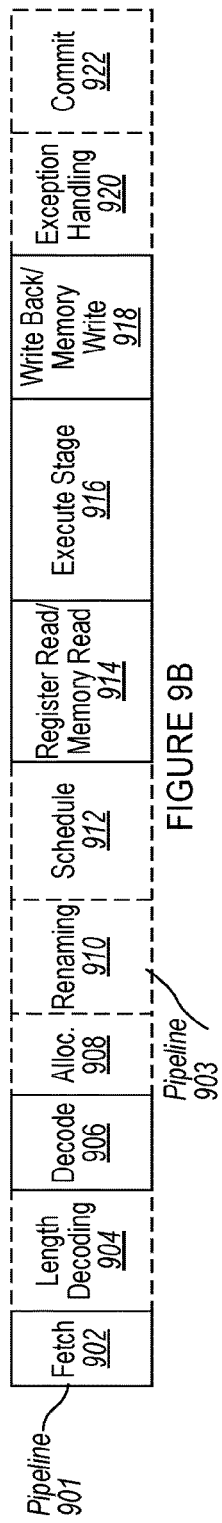
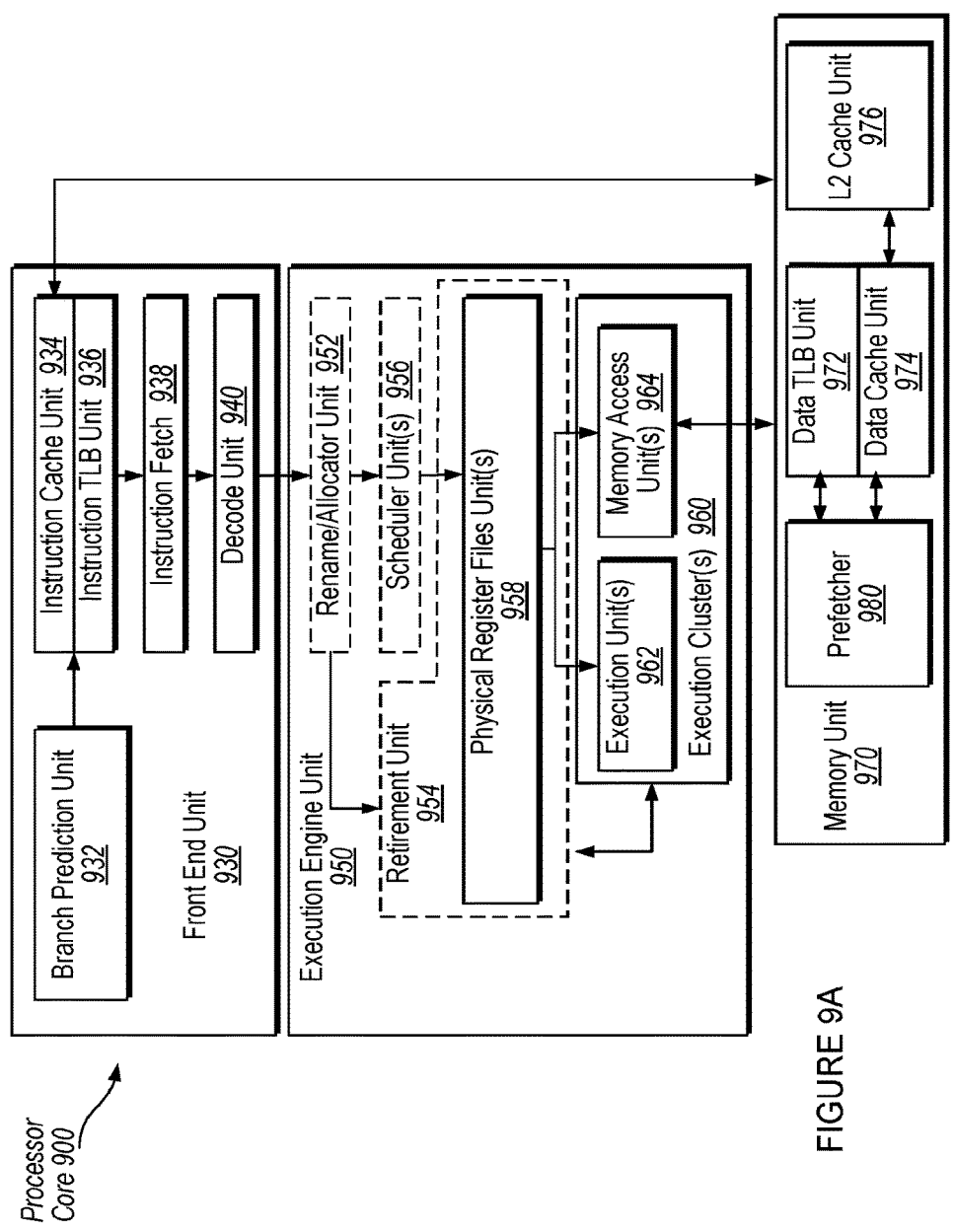

PROTECTION OF KEYS AND SENSITIVE DATA FROM ATTACK WITHIN MICROPROCESSOR ARCHITECTURE

CROSS-REFERENCE TO RELATED APPLICATIONS

This application is a continuation of U.S. application Ser. No. 16/024,259, filed Jun. 29, 2018, which is hereby incorporated by reference.

TECHNICAL FIELD

Aspects of the disclosure relate generally to the field of information processing, and more particularly, to the field of protection of keys and sensitive data from attack within microprocessor architecture.

BACKGROUND

Private information (including sensitive data) and other secrets (cryptographic keys and the like) are used by and stored in many information processing systems. Many techniques have been developed to attempt to store and/or transfer secrets such that they cannot be discovered or altered. These techniques often involve the use of one or more cryptographic keys. Therefore, techniques to protect the integrity of these cryptographic keys have been developed, and more are needed as malicious attacks on information processing systems become an increasingly serious threat.

BRIEF DESCRIPTION OF THE DRAWINGS

FIG. 9A is a block diagram illustrating a micro-architecture for a processor or an integrated circuit that may implement protection of keys and sensitive data within microprocessor architecture, according to an implementation.

FIG. 9B is a block diagram illustrating an in-order pipeline and a register renaming stage, out-of-order issue/execution pipeline that may implement protection of keys and sensitive data within microprocessor architecture, according to one implementation.

DETAILED DESCRIPTION

Figure 1:
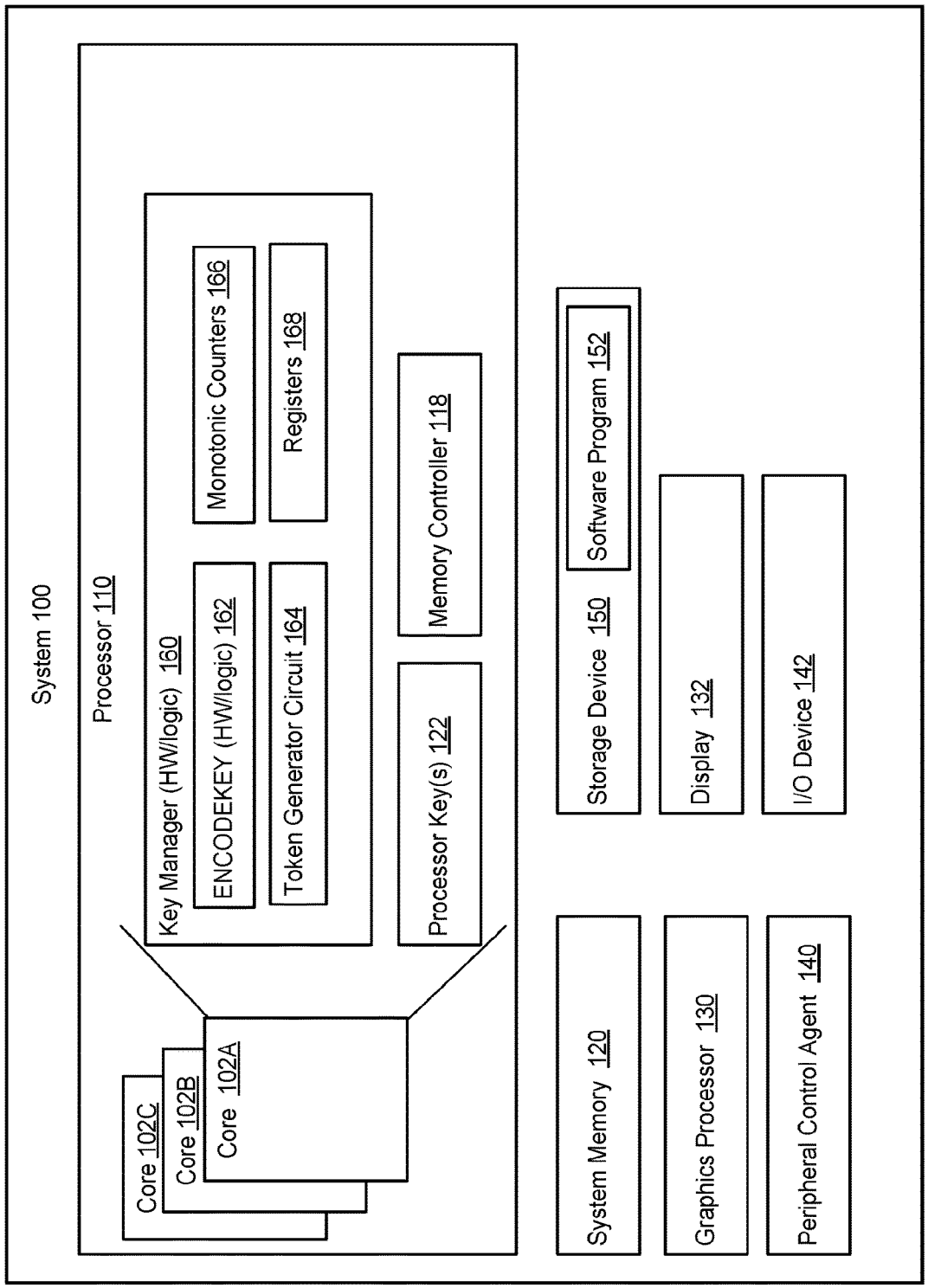
FIG. 1 is a block diagram of a computing system for protecting secret keys and sensitive data within a microprocessor architecture, according to various implementations.

Restricting which code in a software application can access the most sensitive of secrets provides for mitigation of vulnerabilities that arise in one part of an application (e.g., software program) that could leak data from another part of the application, e.g., where the other part of the application is not subjected to as rigorous security processing or data protections. It is challenging to efficiently support such compartmentalization, and so many applications exhibit such vulnerabilities. For example, the Equifax attack involved a vulnerable library that was exploited to leak data from another part of the application. It has been demonstrated that a data-oriented programming attack was possible against Pro File Transfer Protocol (FTP) daemon (ProFTPd) in which vulnerable network request processing code can leak out of the RSA key of the server. Even with fully-precise static Control Flow Integrity (CFI), academics have shown that sufficient coarse-grained gadgets still exist to dump arbitrary memory from NGINX (an open source hypertext transfer protocol (HTTP) web server) in the presence of a vulnerability. So, one technical problem solved herein is to efficiently enforce compartmentalization to protect the secrets within a program even in the presence of vulnerabilities in some parts of the program.

The disclosed implementations include a multifaceted approach in which various constraints are selectively imposed on access to secrets, keys, or other sensitive data or information. For example, the constraints may compartmentalize access to only instructions that contain a matching authorization token, are executed from certain code regions of memory, are associated with a particular logical compartment, and/or other constraints that will be discussed in more detail. A logical compartment may be a collection of code and specific data where the code is authorized to access the specific data.

In various implementations, a processor may include a processor core that includes a token generator circuit or that executes software instructions for a random number generator, for example. The processor core may execute a first instruction (e.g., ENCODEKEY instruction) in response to initialization of a software program that requests access to protected data output by a cryptographic operation. In various embodiments, the software program may be executed within an operating system or may be a stand-alone application or code such as firmware executing directly on hardware. To execute the first instruction, the processor core may retrieve a key that is to be used by the cryptographic operation, trigger the token generator circuit (or the random number generator) to generate an authorization token, and cryptographically encode the key and the authorization token within a key handle. The processor core may further store the key handle in memory and embed the authorization token within a cryptographic instruction that is to perform the cryptographic operation. The cryptographic instruction may be associated with a first logical compartment of the software program that is authorized access to the protected data. In one embodiment, the cryptographic operation is decryption of sensitive cipher text data.

In various implementations, the processor core may further, in response to execution of the cryptographic instruction, retrieve the key handle from the memory, decrypt the key handle to extract the authorization token and the key, match the authorization token from the key handle to the authorization token embedded in the cryptographic instruction to authenticate the key handle, and perform the cryptographic operation using the key to generate the protected data. The processor core may also discard the key in response to completion of the cryptographic operation. In this way the key is protected for a period of time that the key is being used, but not necessarily for the duration of execution of the software program. In other implementations, access to the key may also be made contingent on the cryptographic instruction being executed from a pre-determined code region of memory or being accessed by code associated with a particular logical compartment, as will be explained in more detail. Once the software program has access to the key, the software program may perform a cryptographic operation such as decryption to gain access to sensitive data, secret data, or otherwise protected data.

Typical solutions may control all memory accesses of all parts of a program, to detect whether the program reaches into a private area of memory, but this is processing intensive. Relying on encryption to protect sensitive data, but not all data involved with any memory access, limits the performance overhead to just those code flows that need access to the key used to access protected data, which are likely a small portion of the overall program. For example, access to the OpenSSL private key is only needed during session establishment, so imposing a performance overhead on just those few code flows is advantageous. Accordingly, it is not necessary for confidentiality reasons to prevent malicious access to cipher text, so that can reduce overheads by avoiding the need for full memory safety enforcement.

In the following description, references to "one implementation," "an implementation," "example implementation," "various implementations," etc., indicate that the implementation(s) of the disclosure so described may include particular features, structures, or characteristics, but more than one implementation may and not every implementation necessarily does include the particular features, structures, or characteristics. Further, some implementations may have some, all, or none of the features described for other implementations.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type or of or content of a storage location in a register, table, database, or other data structure, whether implemented in hardware or software, but are not meant to limit implementations of the disclosure to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit implementations of the present disclosure to any particular logical convention, as any logical convention may be used within implementations of the present disclosure.

FIG. 1 is a block diagram of a computing system 100 for protecting secret keys and sensitive data within a microprocessor architecture, according to various implementations. The system 100 may represent any type of information processing system, such as a server, a desktop computer, a portable computer, a set-top box, a hand-held device such as a tablet or a smart phone, or an embedded control system. In various implementations, the system 100 includes a processor 110, system memory 120, a graphics processor 130, a peripheral control agent 140, and a storage device 150. Systems embodying the present features may include any number of each of these components and any other components or other elements, such as peripherals and input/output devices. Any or all of the components or other elements in this or any system implementation may be connected, coupled, or otherwise in communication with each other through any number of buses, point-to-point, or other wired or wireless interfaces or connections, unless specified otherwise. Any components or other portions of system 100, whether shown in FIG. 1 or shown elsewhere in the present disclosure, may be integrated or otherwise included on or in a single chip (a system-on-a-chip or SOC), die, substrate, or package.

The system memory 120 may be dynamic random access memory (DRAM) or any other type of medium readable by the processor 110. A graphics processor 130 may include a processor or other component for processing graphics data for a display 132. A peripheral control agent 140 may represent a component, such as a chipset component, including or through which peripheral, input/output (I/O), or other components or devices, such as an I/O device 142 (e.g., a touchscreen, keyboard, microphone, speaker, other audio device, camera, video or other media device, network adapter, motion or other sensor, receiver for global positioning or other information, etc.) and/or the storage device 150, may be connected or coupled to the processor 110. The storage device 150 may include a type of persistent or non-volatile memory or storage, such as a flash memory and/or a solid state, magnetic, optical disk drive, or a combination thereof. The storage device may store a software program 152 and may be a permanent storage location for software instructions and processed data.

The processor 110 may represent one or more processors or processor cores 102A, 102B, 102C integrated on a single substrate or packaged within a single package, each of which may include multiple threads and/or multiple execution cores, in any combination. Each processor core may further include a memory controller 118, processor keys 122 for local encryption within a particular processor core, and a key manager 160. The memory controller 118 may control and direct storing data and instructions in cache and in the system memory 120. Each processor represented as or in processor 110 may be a specific type of processor, including a processor in the Intel® Core® Processor Family or other processor family from Intel® Corporation or another company, a special purpose processor or microcontroller, or other device or component in an information processing system in which an implementation of the present disclosure may be implemented. The processor 110 may be architected and designed to operate according to any instruction set architecture, with or without being controlled by microcode.

Support for protecting secret keys and sensitive data according to an implementation of the present disclosure may be implemented in a processor, such as the processor 110, using a combination of circuitry and/or logic embedded in hardware, microcode, firmware, and/or other structures arranged as described below or according to another approach, and is represented in FIG. 1 as the key manager 160. In various implementations, the key manager 160 may include ENCODEKEY hardware/logic 162 to support an ENCODEKEY instruction, a token generator circuit 164 to generate one or more authorization tokens, a set of monotonic counters 166, and other registers 168, each of which is described below. The authorization token may be an integer value such as a value that may be generated by a random number generator or other number generator, e.g., by the processor core 102A, 102B, or 102C or via firmware executed by the token generator circuit 164. The registers may also represent other storage locations, such as in flash memory located on-chip of the processor 110, and thus need not be hardware registers in various other implementations.

Figure 2:
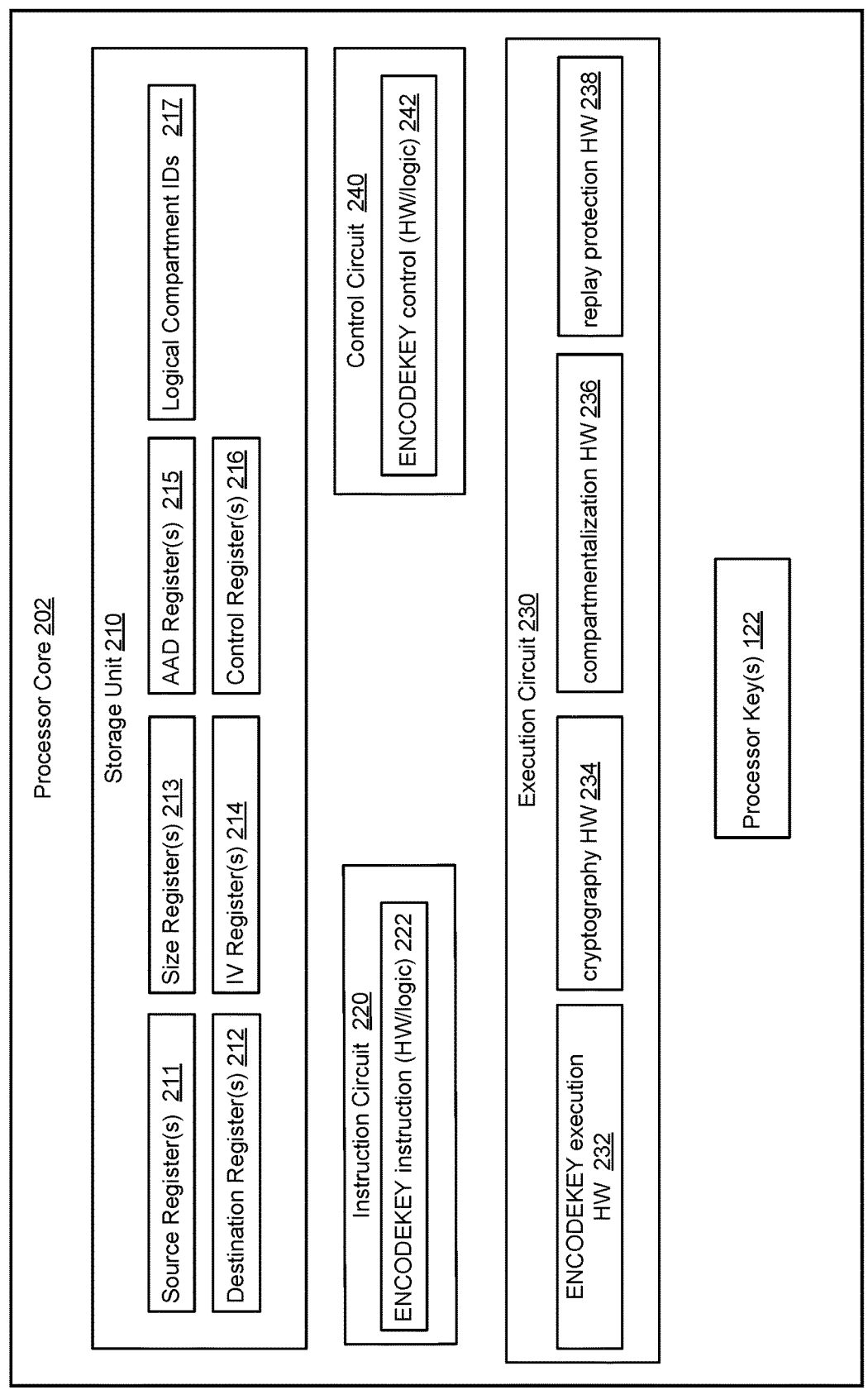
FIG. 2 is a block diagram of a processor of the computing system of FIG. 1, according to various implementations.

FIG. 2 is a block diagram of the processor 110 of the computing system 100 of FIG. 1, according to various implementations. In various implementations, a processor core 202 of the processor 110 may include storage unit 210, an instruction circuit 220, an execution circuit 230, a control circuit 240, and the processor keys 122. The processor core 202 may be one of the processor cores 102A, 102B, or 102C of the processor 110, and the circuitry, structure, and functionality of the key manager 160 of FIG. 1 may be distributed among each component of the processor core 202 as described below. The processor core 202 may also include any other circuitry, structures, or logic not illustrated in FIG. 1.

The storage unit 210 may include any combination of any type of storage usable for a purpose within processor core 202; for example, the storage unit 210 may include a number of readable, writable, and/or read-writable registers, buffers, and/or caches, implemented using any memory or storage technology, in which to store capability information, configuration information, control information, status information, performance information, instructions, data, and other information usable in the operation of the processor core 202, as well as circuitry usable to access such storage and/or to cause or support various operations and/or configurations associated with access to such storage.

The storage unit 210 may include one or more storage locations, each of any size, to be used according to implementations of the present disclosure. Each of these storage locations may be any of (i.e., they need not be the same type of register) a general purpose register, a special purpose registers, an integer register, a floating-point register, a scalar register, a vector register, an XMM register (according to the architecture of a processor family from Intel® Corporation), or any other type of register or storage location of any size, but for convenience, each may be referred to as a register, and each may be referred to by a specific name that is not meant to imply that a specific register is to be used or that the register is dedicated to a special purpose.

The storage unit 210 may include a source register 211 (which may represent a set of registers) to hold a cryptographic key, a value to be used as a cryptographic key, a value from which a cryptographic key may be derived, a portion of such a key, any other data desired to be protected using encryption according to an implementation of the present disclosure, or a pointer to or address or other direct or indirect location identifier of any such key, value, or data. For convenience, the data held, to be loaded into, written to, and/or pointed to by the source register 211 may be referred to as an input key (where the term "input key" is used throughout this description as a convenient way to refer to such data based on one implementation but may mean any data desired to be protected using encryption according to implementations of the present disclosure, and is not limited to a key or a value related to a key.)

The source register 211 or the location to which the source register points may be writable by software being executed by the processor core 202, but need not be readable by software being executed by processor core 202. Although the source register 211 or the location to which it points may be readable by software, its content or the content to which it points may be protected by one or more known security techniques (e.g., by loading an input key into it, performing an encryption operation on the input key according to an implementation of the present disclosure, then clearing it, all by or within a secure boot process, an authenticated code module, a secure or trusted processing environment, etc.).

The storage unit 210 may include a destination register 212 (which may represent a set of registers) to hold a result of an encryption operation according to an implementation of the present disclosure or a pointer to or address or other direct or indirect location identifier of such result. For convenience, the data held, to be read or retrieved from, and/or to be pointed to by the destination register 212 may be referred to as a handle, where each such handle corresponds to a particular input key from which it was derived or is derivable by a particular processor core. Therefore, each such handle is unique to an input key (to the extent provided for by the cryptographic algorithm and length and value of the input key) and unique to a processor core (to the extent provided for by the uniqueness of the processor key, which in various implementations may be shared by two or more processor cores).

In various implementations, the handle is referred to as a "key handle" when protecting a key that is to be used for a cryptographic operation such as decryption of secret data that is to be protected (e.g., RSA key, financial data, or other sensitive data). Other cryptographic operations such as unwrapping and decoding and the like are also envisioned.

In some implementations, the key handle may be stored to memory 120 and not stored to any processor core register to offload the storage of memory blocks containing the key handles to the memory 120.

In various implementations, the destination register 212 or the location to which it points may be readable by software being executed by the processor core 202, but need not be writable by software being executed by processor core 202. Although the destination register 212 or the location to which it points may be readable by software, its content or the content to which it points may be protected by one or more known security techniques (e.g., by loading an input key, performing an encryption operation on the input key according to an implementation of the present disclosure, reading the destination register 212 or the location to which it points, then clearing it, all by or within a secure boot process, an authenticated code module, a secure or trusted processing environment, etc.).

The storage unit 210 may include a size register 213 to hold the size of the input key. For example, in an implementation in which source register 211 holds a pointer to a data buffer in the system memory 120, the size register 213 may be used to hold the number of blocks to be encrypted (e.g., the number of blocks in the data buffer), where each block may be any number of bits (e.g., 128 bits or any other number of bits specified by the encryption algorithm).

The storage unit 210 may include an initialization vector (IV) register 214 (which may represent a set of registers) to hold an IV or a pointer to or address or other direct or indirect location identifier of an IV, where an IV may be an IV (e.g., for Advanced Encryption Standard (AES) cipher-block-chaining (CBC) mode), an initial counter value (e.g., for Advanced Encryption Standard (AES) Galois-counter-mode (GCM)), seed, random number, other value (e.g., as defined by or to be used in or according to any cryptography operation, cipher, or standard), or any data from which such a value may be derived. The IV register 214 or the location to which it points may be writable by software being executed by the processor core 202, but need not be readable by software being executed by the processor core 202. In an implementation, the IV register 214 or the location to which it points may be neither readable nor writable by software, but may be written to or loaded into by hardware (e.g., a hardware random number generator) or firmware. In an implementation in which the IV register 214 or the location to which it points is readable by software, its content or the content to which it points may be protected by one or more known security techniques (e.g., by loading an IV into the IV register 214 or the location to which it points, performing an encryption operation using the IV according to an implementation of the present disclosure, then clearing the IV register 214 or the location to which it points, all by or within a secure boot process, an authenticated code module, a secure or trusted processing environment, etc.).

The storage unit 210 may include an additional authentication data (AAD) register 215 to hold additional data to provide for authentication in addition to encryption as a protection mechanism. For example, in one implementation, the handle is to include an authentication tag or other meta-data that may be used for the processor core 202 to verify that the handle was properly generated using a processor key 122 from the processor core 202.

The storage unit 210 may include a control register 216, which may represent one or more control registers specified or defined according to an existing processor or instruction set architecture, one or more new control registers added to an existing processor or instruction set architecture, or one or more bits/fields in an existing or new register. In various implementations, the control register 216 may include one or more bits to enable one or more features of the present disclosure. For example, the control register 216 may include one or more programmable bits to select a particular logical compartment or data type to be associated with a particular authentication token.

The instruction circuit 220 may include any circuitry, logic, structures, and/or other hardware, such as an instruction decoder, to fetch, receive, decode, interpret, schedule, and/or handle instructions to be executed by the processor core 202. Various instruction formats may be used within the scope of the present disclosure; for example, an instruction may include an opcode and one or more operands, where the opcode may be decoded into one or more micro-instructions or micro-operations for execution by the execution circuit 230. Operands or other parameters may be associated with an instruction implicitly, directly, indirectly, or according to any other approach.

In an implementation, the instruction circuit 220 may include ENCODEKEY instruction hardware/logic 222 (which may include any combination of the hardware/logic listed above) to receive (and/or otherwise process) an ENCODEKEY instruction. Implementations of the present disclosure described below illustrate one or more possible formats of the ENCODEKEY instruction and/or one or more possible responses of a processor core to an ENCODEKEY instruction. Note that the name of this instruction is provided merely for convenience, and implementations of the present disclosure may include such an instruction having any name desired. In various implementations, one or more variants of an ENCODEKEY instruction may be added to an existing ISA as enhancements, extensions, leaves, or other variants of an existing instruction (e.g., a string-copy instruction).

Note also that various implementations of the present disclosure are described and more may be possible, including various differences in the operands/parameters of an ENCODEKEY instruction and the response of a processor core to an ENCODEKEY instruction. In various implementations, different instructions and/or opcodes may be used for each different variety of an ENCODEKEY instruction, or they may be leaves or variants of the same instruction/opcode. Note also that the processor core's execution of and/or response to a ENCODEKEY instruction may also or instead be performed (and/or possibly referred to below as an ENCODEKEY) in response to or in connection with other events (e.g., a write to or setting (by software, firmware, or hardware) of bits of a command, model-specific, or other register; a VM entry or exit; etc.). Implementations of the present disclosure may include any one or more of these variations.

The instruction circuit 220 may support an ISA (e.g., be capable of correctly receiving, handling, and/or sending for execution only the instructions that are in the ISA) that includes an ENCODEKEY instruction but no corresponding decryption instruction. In other words, the ISA allows software to encrypt cryptographic keys and/or other information according to an implementation of the present disclosure, but does not allow the software or any other software to decrypt the encrypted result. In an implementation, the processor core may support such an ISA (e.g., an ISA that include ENCODEKEY instructions but no corresponding decrypt instruction) in a first mode of operation (e.g., a normal mode) but support an ISA that includes a corresponding decryption instruction in a second mode of operation (e.g., a secure mode).

The execution unit 230 may include any circuitry, logic, structures, and/or other hardware, such as arithmetic units, logic units, floating point units, shifters, etc., to process data and execute instructions, micro-instructions, and/or micro-operations. The execution unit 230 may represent any one or more physically or logically distinct execution units. The execution unit 230 may include ENCODEKEY execution hardware 232 to execute an ENCODEKEY instruction as further described below. Although shown as a separate element in FIG. 2, the ENCODEKEY execution hardware 232 may include circuitry that is also used to execute other instructions and/or perform other operations.

The execution circuit 230 may include cryptography hardware 234 to implement any one or more cryptographic algorithms, such as an Advanced Encryption Standard (AES) algorithm in electronic-code-book (ECB), Galois-counter-mode (GCM), and/or cipher-block-chaining (CBC) mode. Alternatively, the encryption may be performed by other hardware (e.g., shared, general-purpose hardware) in the execution circuit 230. The input to any such encryption hardware/algorithm may be referred to as plain-text and the output as cipher-text.

The processor keys 122 (as further described below) may be within, hardwired, or otherwise connected to the cryptography hardware 234 and/or the execution circuit 230 such that processor keys 122 may be used as a cryptographic key in any one or more encryption algorithms performed by cryptographic hardware 234 and/or execution circuit 230, without exposing the processor keys 122 to software or discovery. In many implementations, only the encryption hardware within processor core 202 has access to processor keys 122.

The execution circuit 230 may further include compartmentalization hardware 236 to implement any one or more compartmentalization techniques, including enforcing policies associated with compartmentalizing access of certain input keys to certain types of software, software code that is stored in a fixed portion of memory, or by certain logical compartments, as will be discussed in more detail.

The execution unit 230 may further include replay protection hardware 238 to implement and enforce policies intended to prevent replay (or reuse) of an old encrypted memory block, which an attacker may try to trigger with various techniques. In some implementations, the replay protection hardware 238 may trigger a monotonic counter (of the set of monotonic counters 166) to increment a value of the monotonic counter, which is associated with a base address in the memory for the memory block. The replay protection hardware 238 may further apply a tweak, using both the base address in the memory for the memory block and the value of the monotonic counter, to encrypt the memory block. The value of the monotonic counter may then be used for decryption (e.g., by application of the same tweak) of the memory block. Because an attacker does not have access to the monotonic counter, the replay protection hardware 238 may prevent replay (or use) of an old memory block that has been encrypted by a single-use value of the monotonic counter. This also prevents the memory block from being moved and being successfully decrypted at the new location, since the base address in the memory for the memory block is incorporated into the tweak. For example, this could be beneficial for preventing stack allocations from being moved to cause them to be misused or leaked by processing them with unauthorized code.

Figure 3:
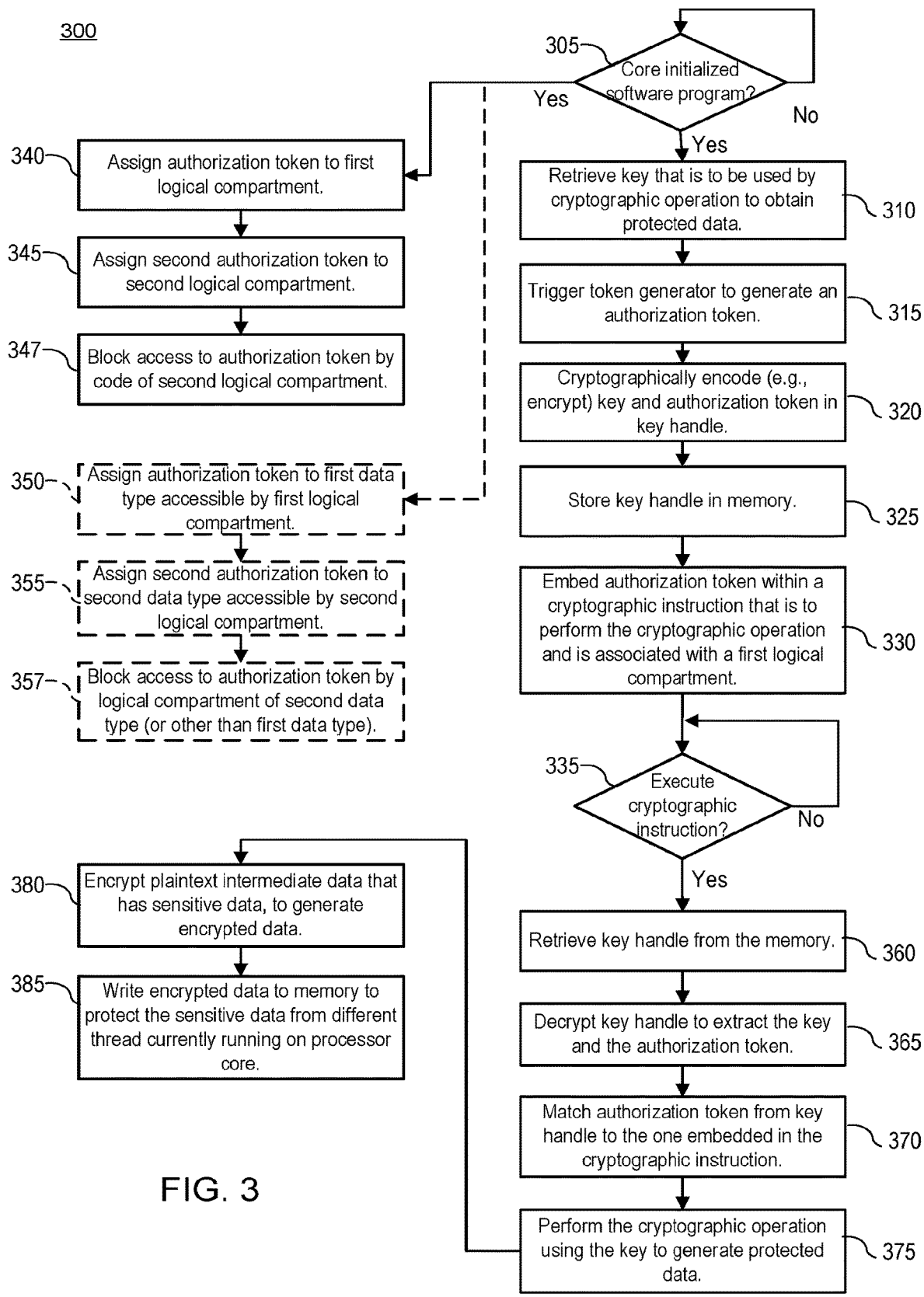
FIG. 3 is a flow chart of a method by which the processor core of FIG. 2 protects secret keys and sensitive data, according to various implementations.

FIG. 3 is a flow chart of a method by which the processor core of FIG. 2 protects secret keys and sensitive data, according to various implementations. The method 300 may be performed by processing logic that may comprise hardware (e.g., circuitry, dedicated logic, programmable logic, microcode, etc.), software (such as instructions run on a processing device), firmware, or a combination thereof. In one implementation, the processor 110 or the processor core 202 in FIGS. 1-2 may perform the method 300. Although shown in a particular sequence or order, unless otherwise specified, the order of the processes can be modified. Thus, the illustrated implementations are only examples, and the illustrated processes can be performed in a different order, and some processes may be performed in parallel. Additionally, one or more processes can be omitted in various implementations. Thus, not all processes are required in every implementation. Other process flows are possible, including that are combined with those processes in other flow charts described herein.

Referring to FIG. 3, the method 300 may begin with the processing logic determining whether the processor core has initialized a software program or application that requests access to protected data output by a cryptographic operation (305). The software program may be a library program that accesses library routines such as within the OpenSSL library, for example, although many other programs or routines are envisioned. The method 300 may continue with the processing logic retrieving a key that is to be used by the cryptographic operation (310). The cryptographic operation is generally an operation such as decryption or unwrapping that will expose secret or sensitive data that is considered protected data. The method 300 may continue with the processing logic triggering the token generator circuit 164 (or random number generator of processor core) to generate an authorization token (315). The method 300 may continue with the processing logic cryptographically encoding (e.g., encrypting or wrapping with a processor key) the key and the authorization token within a key handle (320).

The method 300 may continue with the processing logic storing the key handle in memory 120 (325). In another implementation, the key handle is stored local to the processor core 202, such as in one of the destination registers 212 of the storage unit 210. The method 300 may continue with the processing logic embedding the authorization token within a cryptographic instruction that is to execute the cryptographic operation (330). The cryptographic instruction may be associated with a first logical compartment of the software program that is authorized access to the protected data. In implementations, the first logical compartment includes a collection of first code and first data that the code is authorized to access. Furthermore, to embed the authorization token within the cryptographic instruction may be to store or insert the authorization token as one of a register operand or an immediate operand within the cryptographic instruction. Other forms of embedding are envisioned. Note that performance of blocks 310 through 330 may be carried out by the processor core 202 executing the ENCODEKEY instruction.

In implementations, the cryptographic instruction may be adapted to call for, or otherwise trigger, the execution of the cryptographic operation during runtime of the software program. For example, the cryptographic instruction may be an instruction that performs AES decryption. To provide further security, the processor core 202 may further mark the cryptographic instruction as execute-only status in memory permissions associated with a location in memory where the cryptographic instruction is stored.

With further reference to FIG. 3, the method 300 may continue with the processing logic determining whether the cryptographic instruction has been called for execution (335). If yes, the method 300 may continue with the processing logic retrieving the key handle from the memory (360), decrypting the key handle to extract the authorization token and the key (365), and matching the authorization token from the key handle to the authorization token embedded in the cryptographic instruction to authenticate the key handle (370). In response to the matching, the method 300 may continue with the processing logic performing the cryptographic operation using the key to generate the protected data (375). In implementations, the software program may now use the key to decrypt sensitive cipher text data into plaintext data for use by the software program, e.g., to generate a credit card number, other financial data, or an RSA key in plaintext.

To provide further security, plaintext data is to be protected in some way while it is being processed, particularly during execution of the cryptographic operation at block 375. The contents of registers are private to the current logical processor, but may be exposed in memory when the current thread is preempted with user-mode threading or when registers are spilled to the stack due to register pressure. Thus, it may be beneficial to prohibit use of user-mode threading during execution of the cryptographic operation, encrypt a thread state and data from spilled registers that are stored to user mode memory (and possibly also protect it from corruption and replay), and/or defer preemption of execution to the user-mode threading during execution of the cryptographic operation.

In various implementations, any plaintext intermediate data that may be tainted with sensitive data may be encrypted prior to being written to memory to prevent unauthorized access from concurrently-executing threads. Accordingly, the method 300 may continue with the processing logic, in response to execution of the cryptographic instruction, perform the cryptographic operation by encrypting plaintext intermediate data that contains sensitive data as a result of execution of the cryptographic operation, to generate encrypted data (375). The method 300 may continue with the processing logic writing the encrypted data to the memory to protect the sensitive data from access by at least a second thread currently in execution by the processor core (380). Any memory regions of memory that may be tainted with sensitive data may be stored in memory that is only accessible from the current logical processor. These memory regions may then be cleared or encrypted prior to transferring control to any other logical compartment on that logical processor.

With continued reference to FIG. 3, the method 300 may continue with the processing logic, in response to the processor core initializing the software program at block 305 (or even before this point), assigning the authorization token to the first logical compartment (340) and assigning a second authorization token to a second logical compartment (345). In implementations, the second logical compartment includes second code and second data that the second code is authorized to access, the second data being different than the first data. The method 300 may continue with the processing logic blocking access to the authorization token by the second code of the second logical compartment (347). In this way, the processor core 202 may compartmentalize access to certain protected data only by corresponding logical compartments that may require such access, and thus are assigned different authorization tokens to ensure compartmentalized access.

With continued reference to FIG. 3, the cryptographic operation may be associated with the first logical compartment and a second cryptographic operation may be associated with a second logical compartment. The method 300 may continue with the processing logic, additionally or alternatively, assigning the authorization token to a first data type (e.g., credit card numbers) that is accessible by the first logical compartment but not by the second logical compartment (350) and assigning a second authorization token to a second data type (e.g., RSA Transport Layer Security (TLS) keys) that is accessible by the second logical compartment but not by the first logical compartment (355). The method 300 may continue with the processing logic blocking access to the authorization token by a logical compartment of the second data type, e.g., access by the second code of the second logical compartment (357).

Accordingly, the first code that may access credit card numbers is denied access to RSA TLS keys. In this way, access to protected data may be made contingent on the type of data that a particular logical compartment is allowed or authorized to access, which is controlled by assignment of authorization tokens to data types. For example, it would be unwise to define a policy that uses an identical authorization token for multiple data types. Each type of data may be handled appropriately by separate code flows. For example, it may be permissible for a business to transmit credit card numbers to authorized business partners, but the business should not send their TLS private key to any other entity. If a single authorization token was used for both types of data, there would be a risk of an attacker passing the authorization token for the TLS private key to the cryptographic instruction in the credit card code flows to cause a leak of the TLS private key.

Figure 4:
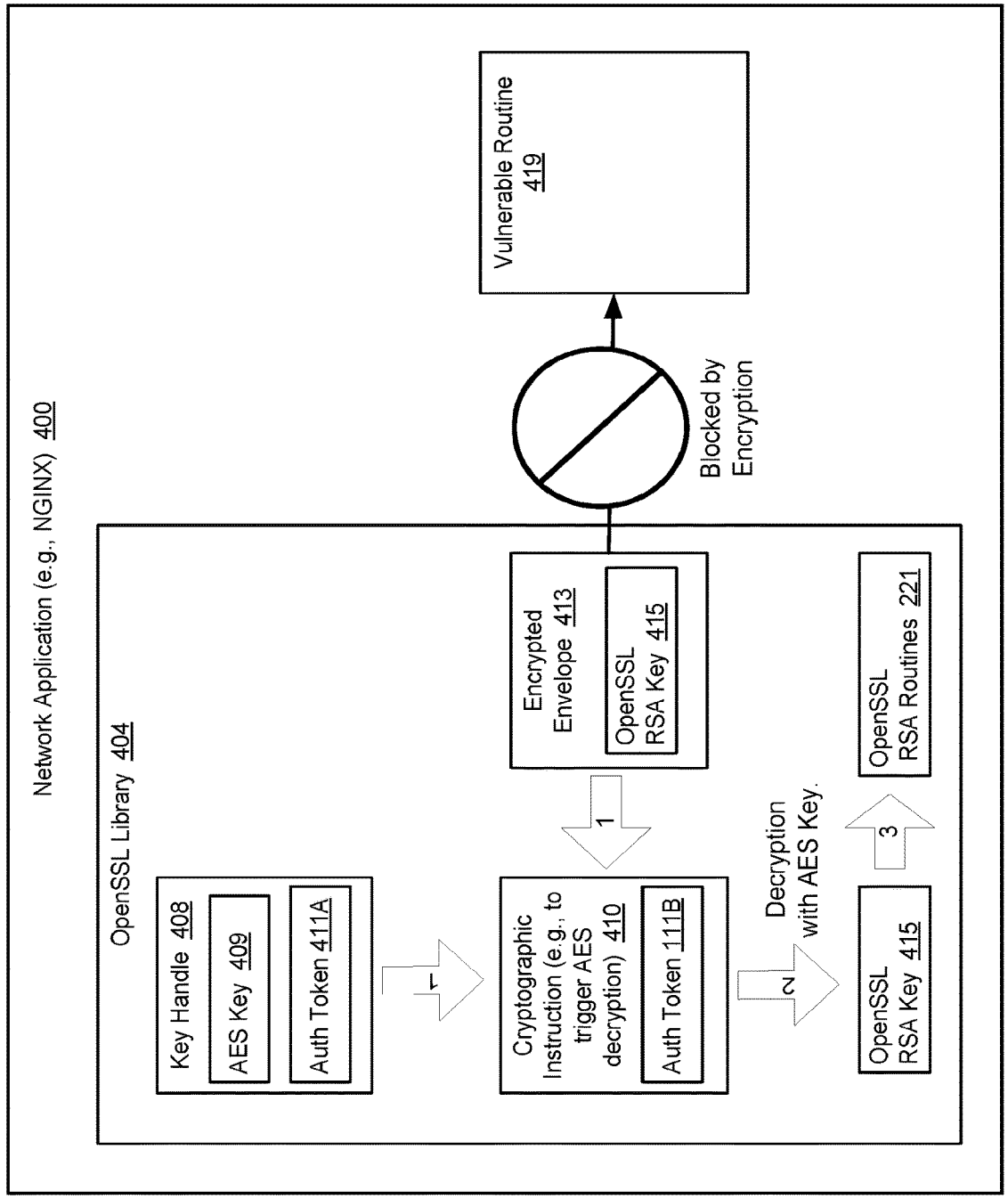
FIG. 4 is a block diagram illustrating an exemplary use of an authorization token to protect an AES key used for decryption of an RSA key according to one implementation.

FIG. 4 is a block diagram illustrating an exemplary use of an authorization token to protect an AES key used for decryption of an RSA key according to one implementation. The block diagram illustrates a network application 400 (e.g., NGINX) that is to be executed to provide access to sensitive data (in this case, an OpenSSL RSA key) and that is to block access by a vulnerable routine 419 within the network application 400. The network application 400 may include an OpenSSL library 404 (a type of cryptographic library) and the vulnerable routine 419 as well for purposes of explanation.

In the present implementations, the OpenSSL library 404 may include (or have associated with it) a key handle 408, a cryptographic instruction 410, and an encrypted envelope 413. The key handle 408 may be generated when the execution circuit 230 (FIG. 2) (e.g., the ENCODEKEY execution hardware 232) executes the ENCODEKEY instruction, to cause encryption of a combination of an AES key 409 and an authorization token 411A, as previously discussed. In one implementation, a cryptographic instruction 410 may include an authorization token 411B as was also previously embedded during program initialization of the network application 400, and in normal execution would be the same as the authorization token 411A encrypted in the key handle 408. The encrypted envelope 413 may protect, using encryption (such as AES encryption) an OpenSSL RSA key 415 that is needed to perform a number of OpenSSL RSA routines 221, e.g., to protect a network browser online session.

In implementations, the processor core 202 (e.g., the execution circuit 230) may execute the cryptographic instruction 410 by retrieving the key handle 408 from memory 120 and decrypting the key handle 408, to extract the AES key 409 and the authorization token 411A. The processor core 202, in continued execution of the cryptographic instruction, may further match its authorization token 411B with the authorization token 411A from the key handle 408. Assuming the authorization token 411B matches the authorization token 411A, the cryptographic instruction may perform the cryptographic operation, e.g., in this example to decrypt the encrypted envelope 413 with the AES key 409 to extract the OpenSSL RSA key 415. In this scenario, the logical compartment with which the cryptographic instruction is associated may be the OpenSSL session establishment routine(s) that invoke the openSSL RSA routines 221. At this point, the OpenSSL RSA routines 221 may use the OpenSSL RSA key 415 to secure the online session of the network browser of the network application 400.

The vulnerable routine 419, in contrast, lacks the authorization token 411A and thus, upon attempting to access the OpenSSL RSA key 415, is blocked by encryption of the encrypted envelope 413. Lacking the permission provided by the authorization token 411, the vulnerable routine 419 may access cipher text data of the encrypted envelope 413, but is unable to decrypt the encrypted envelope 413 (for which is required the authorization token 411A) and gain access to the OpenSSL RSA key 415.

Figure 5:
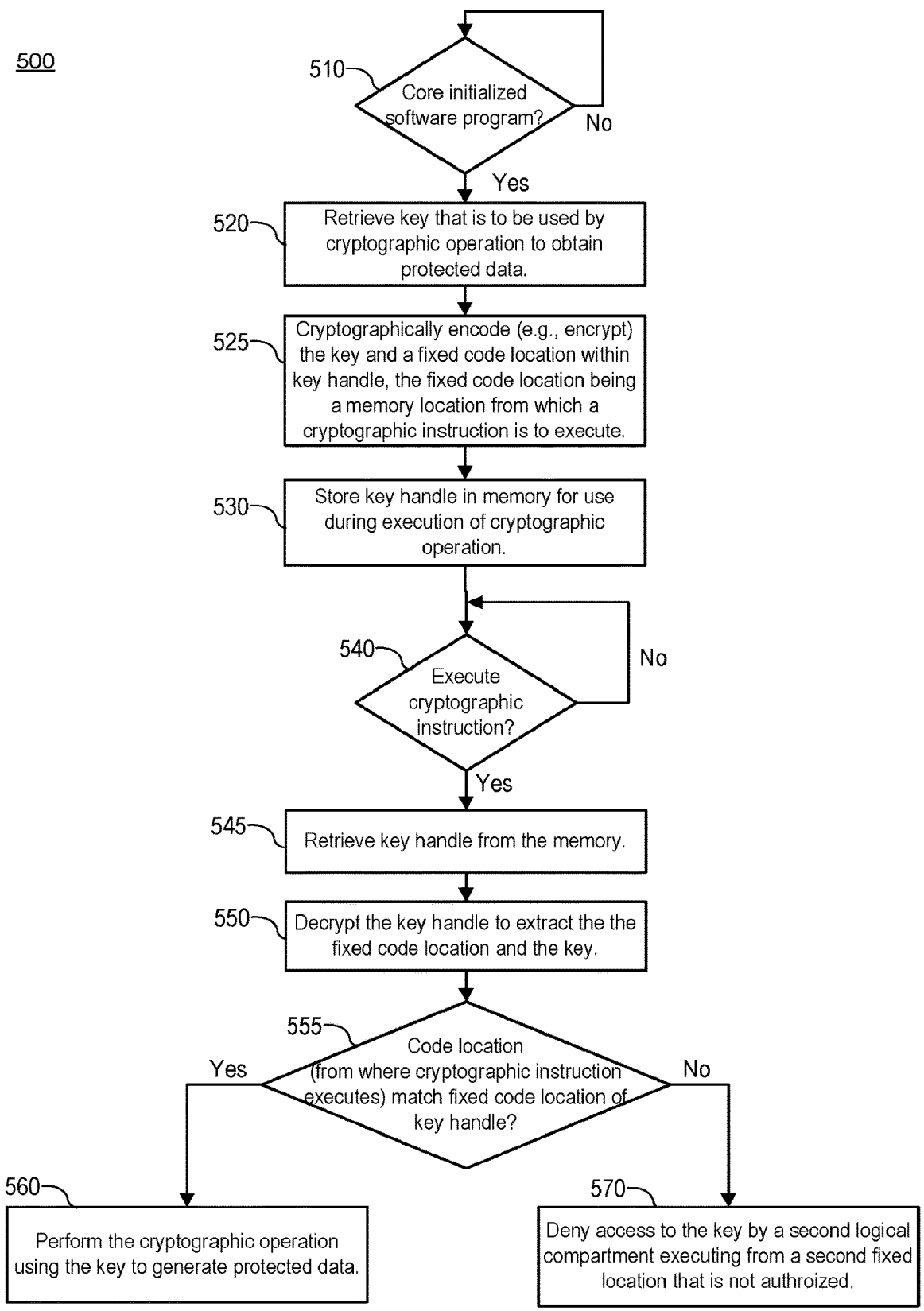
FIG. 5 is a flow chart for a method by which the processor core of FIG. 2 protects secret keys and sensitive data, according to an alternate implementation.

FIG. 5 is a flow chart for a method 500 by which the processor core 202 of FIG. 2 protects secret keys and sensitive data, according to an alternate implementation. The method 500 may be performed by processing logic that may comprise hardware (e.g., circuitry, dedicated logic, programmable logic, microcode, etc.), software (such as instructions run on a processing device), firmware, or a combination thereof. In one implementation, the processor 110 or the processor core 202 in FIGS. 1-2 may perform the method 500. Although shown in a particular sequence or order, unless otherwise specified, the order of the processes can be modified. Thus, the illustrated implementations are only examples, and the illustrated processes can be performed in a different order, and some processes may be performed in parallel. Additionally, one or more processes can be omitted in various implementations. Thus, not all processes are required in every implementation. Other process flows are possible, including that are combined with those processes in other flow charts described herein.

With reference to FIG. 5, the method 500 may begin by the processing logic determining whether the processor core 202 has initialized a software program that includes a cryptographic operation (510). If yes, the method 500 may continue with the processing logic retrieving, in response to initialization of the software program, a key that is to be used by the cryptographic operation (520). The method 500 may continue with the processing logic cryptographically encoding (e.g., encrypting) the key and a fixed code location within a key handle (525). The fixed code location may be a location in memory from which a cryptographic instruction (associated with a first logical compartment of the software program) is to execute to trigger execution of the cryptographic operation. In implementations, the logical compartment is a collection of code and data that the code is authorized to access. The method 500 may continue with the processing logic storing the key handle in memory 120 (530). In this way, an authorization token is not needed and instead authorization is provided by the logical compartment that requests access to protected data being executed from one a list of fixed locations that may be authorized within one or more cryptographic instructions.

The method 500 may continue with the processing logic determining whether the processor core 202 has been requested to execute the cryptographic instruction (540). If yes, the method 500 may continue with the processing logic retrieving the key handle from the memory (545) and decrypting the key handle to extract the fixed code location and the key (550). The method 500 may continue with the processing logic determining whether the code location, from where the cryptographic instruction executes, matches the fixed code location from the key handle (555). If yes, the method 500 may continue with the processing logic performing the cryptographic operation using the key to generate the protected data (560). If no, the method 500 may continue with the processing logic denying access to the key by the second cryptographic instruction, which is associated with a second logical compartment of the software program (570). In some implementations, the cryptographic instruction is embedded with a list of a set of fixed code locations, so the denial of access may be in response to the second fixed code location not matching any of the set of fixed code locations. In these implementations, the key handle would be further adapted to include the list of fixed code locations.

Note that in addition to encryption and enforcement of logical compartment-specific policies, the processor core 202 may be designed to avoid being tricked into replaying (or reusing) an old encrypted memory block stored in the memory 120 by an attacker. In the present implementations, the concern is the replay of a memory block containing an old key handle or some encrypted sensitive intermediate data generated during execution of the cryptographic operation. In implementations, the processor core 202 is to read values of the encrypted memory block and use it only once, as the processor core 202 may then update that location with new values of an updated encrypted memory block. Accordingly, the processing core 202 is to access the new values, not the previous (old) values, which may have security implications as well so that stale key handles are not used. To provide replay prevention, the processor core 202 may, in some implementations, incorporate some changing data with the encrypted data of a memory block. That changing data may be generated by a monotonic counter of the set of monotonic counters 166, which can be incremented but not decremented.

Figures 6A, 6B:
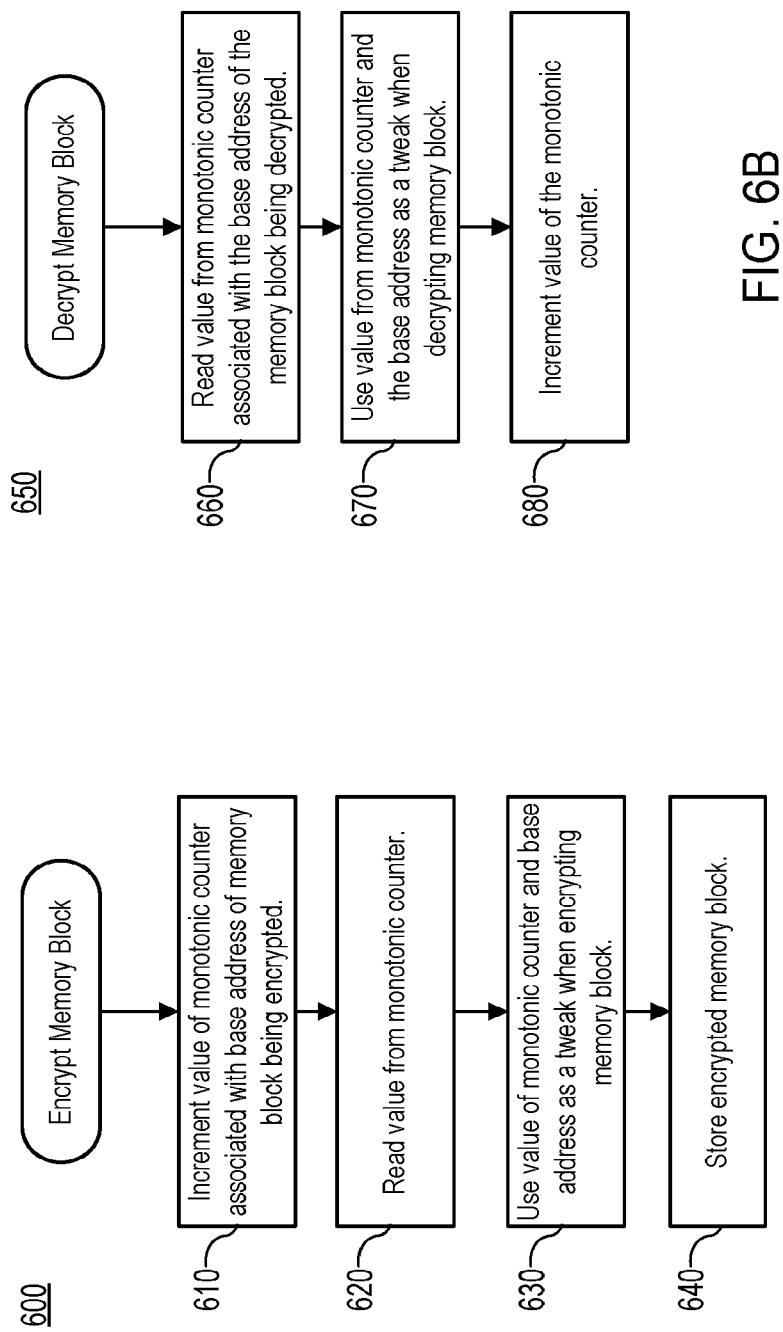
FIG. 6A is a flow chart of a method of encryption of a memory block while providing replay protection according to an implementation.
FIG. 6B is a flow chart of a method of decryption of the memory block while providing replay protection according to an implementation.

FIG. 6A is a flow chart of a method 600 of encryption of a memory block while providing replay protection according to an implementation. FIG. 6B is a flow chart of a method 650 of decryption of the memory block while providing replay protection according to an implementation. The methods 600 and 650 may be performed by processing logic that may comprise hardware (e.g., circuitry, dedicated logic, programmable logic, microcode, etc.), software (such as instructions run on a processing device), firmware, or a combination thereof. In one implementation, the processor 110 or the processor core 202 in FIGS. 1-2 may perform the methods 600 and 650. Although shown in a particular sequence or order, unless otherwise specified, the order of the processes can be modified. Thus, the illustrated implementations are only examples, and the illustrated processes can be performed in a different order, and some processes may be performed in parallel. Additionally, one or more processes can be omitted in various implementations. Thus, not all processes are required in every implementation. Other process flows are possible, including that are combined with those processes in other flow charts described herein.

With reference to FIG. 6A (for encrypting a memory block), the method 600 may begin with the processing logic incrementing a value of a monotonic counter, of the set of monotonic counters 166, which is associated with a base address in the memory for the memory block (610). The method 600 may continue with the processing logic reading the value from the monotonic counter (620) and applying a tweak, using both the base address in the memory for the memory block and the value of the monotonic counter, to encrypt the memory block (630). The tweak may be created via various methods, including concatenation of values for the base address and the monotonic counter. Alternatively, or additionally, these two values may be processed with a hash or hash-like algorithm, and the results of the hash may be used as the tweak. Remember that the memory block may contain the key handle or sensitive intermediate data generated during execution of the cryptographic operation. The method 600 may continue with the processing logic storing the encrypted memory block in the memory 120 (640).

With reference to FIG. 6B (for decrypting the memory block), the method 650 may begin with the processing logic reading the value from the monotonic counter associated with the base address of the memory block being decrypted (660). The method 650 may continue with the processing logic using both the base address in the memory for the memory block and the value from the monotonic counter as a tweak to decrypt the memory block to generate protected data in plaintext (670) and incrementing the value of the monotonic counter (680). In this way, the monotonic counter value has now increased and further decryption of memory blocks will require the new monotonic counter value. This may have the effect of invalidating any encrypted memory blocks associated with a cryptographic processing session that may remain in the memory 120.

The preceding mechanism focuses on enforcing a single-use policy for individual memory blocks, but a related policy that may be employed is to permit multiple uses of certain memory blocks and then be able to efficiently revoke access to them at a specified point in program execution. This action may invalidate previously encrypted memory blocks, which may include a key handle or other sensitive intermediate data. As an example, in two credit card processing sessions, during the second session, the processor core 202 is to purge data related to first session from memory.

Thus, bulk invalidation of previously encrypted may be accomplished by rotating the CPU-internal key used to encrypt key handles so that previously-generated key handles become unusable. For example, the processor core 202 may employ a processor key to encrypt the key and the authorization token within the key handle for use during a first processing session, wherein the key handle is a first key handle. In response to completion of the first processing session, the processor core may employ a second processor key to encrypt the key and the authorization token within a second key handle associated with a second processing session upon completion of the first processing session. In this way, all key handles generated with an old key are no longer accessible or useable. If software comes along and tries to decrypt an AES decryption instruction with an old key handle, the key handle is going to be rejected. Transitively, the data that the key handles protect in memory are also rendered inaccessible. For example, this may be useful in a server application that processes multiple requests at different times so that it can revoke access to the sensitive data associated with a completed request without requiring that all such data be cleared from memory.

Revoking all previously-generated key handles at some point in time may be undesirable, since there may be just a subset of key handles that need to be revoked. Accordingly, in an alternative implementation, the processor core 202 may support multiple processor keys 122 for encrypting key handles so that groups of key handles may be selectively revoked. Each ENCODEKEY instruction may accept a new parameter to select a particular processor key, and a key identifier may be stored in the key handle. Alternatively, to provide additional efficiency, a value of a monotonic counter may be selected rather than a key, so that the monotonic counter value is incorporated as a tweak, as described with reference to FIG. 7. Updating the counter may revoke associated keys generated previously when using that counter value.

Figure 7:
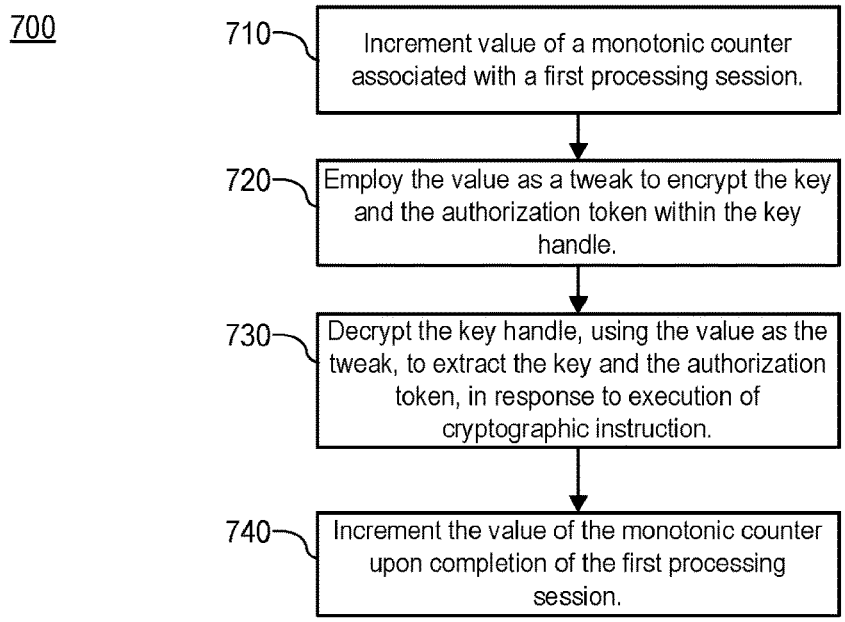
FIG. 7 is a flow chart of a method of encryption of key handles in a way that enables group revocation of key handles used during a particular processing session according to an implementation.

FIG. 7 is a flow chart of a method 700 of encryption of key handles in a way that enables group revocation of key handles used during a particular processing session, e.g., after completion of the processing session according to an implementation. The method 700 may be performed by processing logic that may comprise hardware (e.g., circuitry, dedicated logic, programmable logic, microcode, etc.), software (such as instructions run on a processing device), firmware, or a combination thereof. In one implementation, the processor 110 or the processor core 202 in FIGS. 1-2 may perform the method 700. Although shown in a particular sequence or order, unless otherwise specified, the order of the processes can be modified. Thus, the illustrated implementations are only examples, and the illustrated processes can be performed in a different order, and some processes may be performed in parallel. Additionally, one or more processes can be omitted in various implementations. Thus, not all processes are required in every implementation. Other process flows are possible, including that are combined with those processes in other flow charts described herein.

With reference to FIG. 7, the method 700 may begin with the processing logic incrementing a value of a monotonic counter of the set of monotonic counters, wherein the value is associated with a first processing session of the software program (710). The method 700 may continue with the processing logic employing the value as a tweak to encrypt the key and the authorization token within the key handle (720). This tweak may be applied to encrypt additional key handles during the first processing session. The method 700 may continue with the processing logic, in response to execution of the cryptographic instruction, decrypt the key handle, using the value as the tweak to extract the key and the authorization token (730). The method 700 may continue with the processing logic in response to completion of the first processing session, increment the value of the monotonic counter to invalidate further use of the key handle (and the additional key handles) during a second processing session (740).

The present disclosure has explained possible implementation for ensuring that data of the appropriate type is used by each compartment (e.g., TLS keys versus credit card data) by defining multiple key handles. Another possible implementation that may be easier to manage is to share a single key handle and pass an immediate operand (e.g., a data type specifier) identifying a particular type of data to each cryptographic instruction for use in executing the cryptographic operation. That immediate operand may be used as a tweak. This approach may be used for distinguishing the same types of data that have the same lifetime. In one example, the executing program processes both credit card data and RSA key data, but does not have to revoke credit card data partway through execution of the program. Accordingly, this implementation, described in detail with reference to FIG. 8, may include different code flows for credit card data than RSA key data, preventing an attacker from feeding RSA key data into code flow for credit card data to access the RSA key data.

Figure 8:
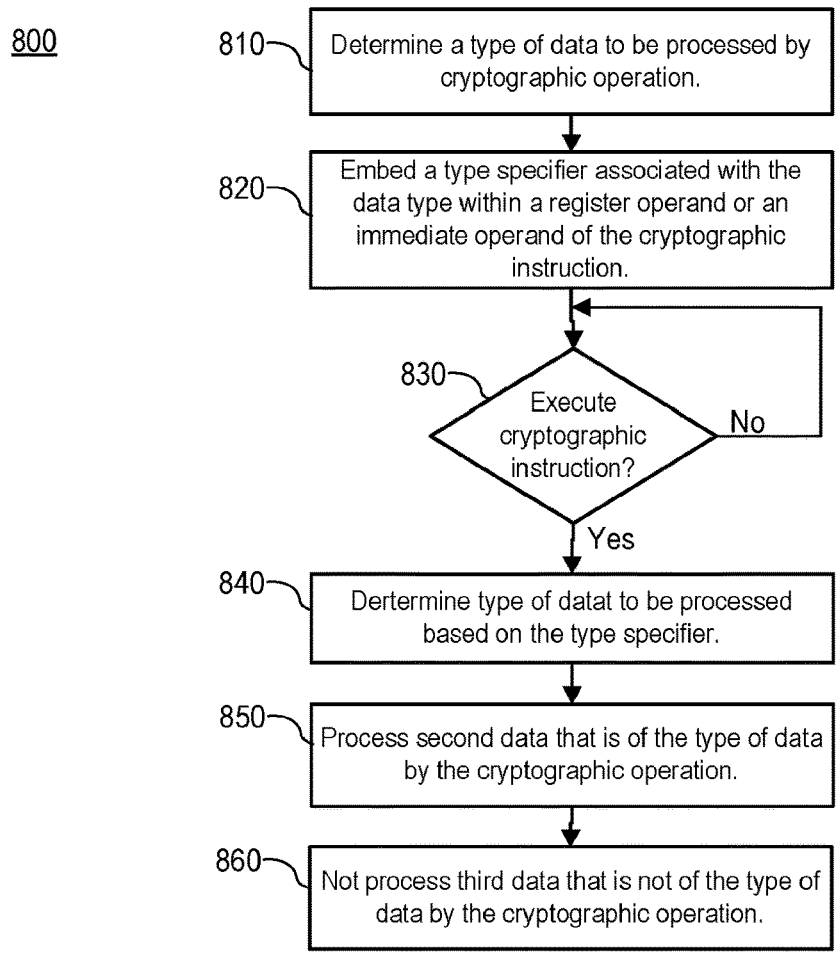
FIG. 8 is a flow chart of a method of compartmentalization of use of key handles during cryptographic operations according to type of data in various implementations.

FIG. 8 is a flow chart of a method 800 of compartmentalization of use of key handles during cryptographic operations according to type of data in various implementations. The method 800 may be performed by processing logic that may comprise hardware (e.g., circuitry, dedicated logic, programmable logic, microcode, etc.), software (such as instructions run on a processing device), firmware, or a combination thereof. In one implementation, the processor 110 or the processor core 202 in FIGS. 1-2 may perform the method 800. Although shown in a particular sequence or order, unless otherwise specified, the order of the processes can be modified. Thus, the illustrated implementations are only examples, and the illustrated processes can be performed in a different order, and some processes may be performed in parallel. Additionally, one or more processes can be omitted in various implementations. Thus, not all processes are required in every implementation. Other process flows are possible, including that are combined with those processes in other flow charts described herein.

With reference to FIG. 8, the method 800 may begin with the processing logic determine a type of data to be processed by the cryptographic operation (810). The method 800 may continue with the processing logic embedding a type specifier associated with the data type within one of a register operand or an immediate operand of the cryptographic instruction (820). The method 800 may continue with the processing logic determining whether the cryptographic instruction has been triggered for execution (830). In response to execution of the cryptographic instruction, the method 800 may continue with the processing logic determining the type of data to be processed based on the type specifier (840). The method 800 may continue with the processing logic of the cryptographic operation processing second data that is of the type of data (850) and not processing third data that is not of the type of data (860).

FIG. 9A is a block diagram illustrating a micro-architecture for a processor 900 that may implement protection of keys and sensitive data within microprocessor architecture, according to an implementation. Specifically, processor 900 depicts an in-order architecture core and a register renaming logic, out-of-order issue/execution logic to be included in a processor according to at least one implementation of the disclosure.

Processor 900 includes a front end unit 930 coupled to an execution engine unit 950, and both are coupled to a memory unit 970. The processor 900 may include a reduced instruction set computing (RISC) core, a complex instruction set computing (CISC) core, a very long instruction word (VLIW) core, or a hybrid or alternative core type. As yet another option, processor 900 may include a special-purpose core, such as, for example, a network or communication core, compression engine, graphics core, or the like. In one implementation, processor 900 may be a multi-core processor or may be part of a multi-processor system.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 940 may be implemented using various different mechanisms. Examples of suitable mechanisms include, but are not limited to, look-up tables, hardware implementations, programmable logic arrays (PLAs), microcode read only memories (ROMs), etc. The instruction cache unit 934 is further coupled to the memory unit 970. The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different scheduler circuits, including reservations stations (RS), central instruction window, etc. The scheduler unit(s) 956 is coupled to the physical register set(s) unit(s) 958. Each of the physical register set(s) units 958 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 958 is overlapped by the retirement unit 954 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 954 and the physical register set(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 956, physical register set(s) unit(s) 958, and execution cluster(s) 960 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain implementations are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which may include a data prefetcher 980, a data TLB unit 972, a data cache unit (DCU) 974, and a level 2 (L2) cache unit 976, to name a few examples. In some implementations DCU 974 is also known as a first level data cache (L1 cache). The DCU 974 may handle multiple outstanding cache misses and continue to service incoming stores and loads. It also supports maintaining cache coherency. The data TLB unit 972 is a cache used to improve virtual address translation speed by mapping virtual and physical address spaces. In one exemplary implementation, the memory access units 964 may include a load unit, a store address unit, and a store data unit, each of which is coupled to the data TLB unit 972 in the memory unit 970. The L2 cache unit 976 may be coupled to one or more other levels of cache and eventually to a main memory.

In one implementation, the data prefetcher 980 speculatively loads/prefetches data to the DCU 974 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 900 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, CA).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 9B is a block diagram illustrating an in-order pipeline and a register renaming stage, out-of-order issue/execution pipeline that may implement protection of keys and sensitive data within microprocessor architecture as per processor 900 of FIG. 9A according to some implementations of the disclosure. The solid lined boxes in FIG. 9B illustrate an in-order pipeline 901, while the dashed lined boxes illustrate a register renaming, out-of-order issue/execution pipeline 903. In FIG. 9B, the pipelines 901 and 903 include a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924. In some implementations, the ordering of stages 902-924 may be different than illustrated and are not limited to the specific ordering shown in FIG. 9B.

Figure 10:
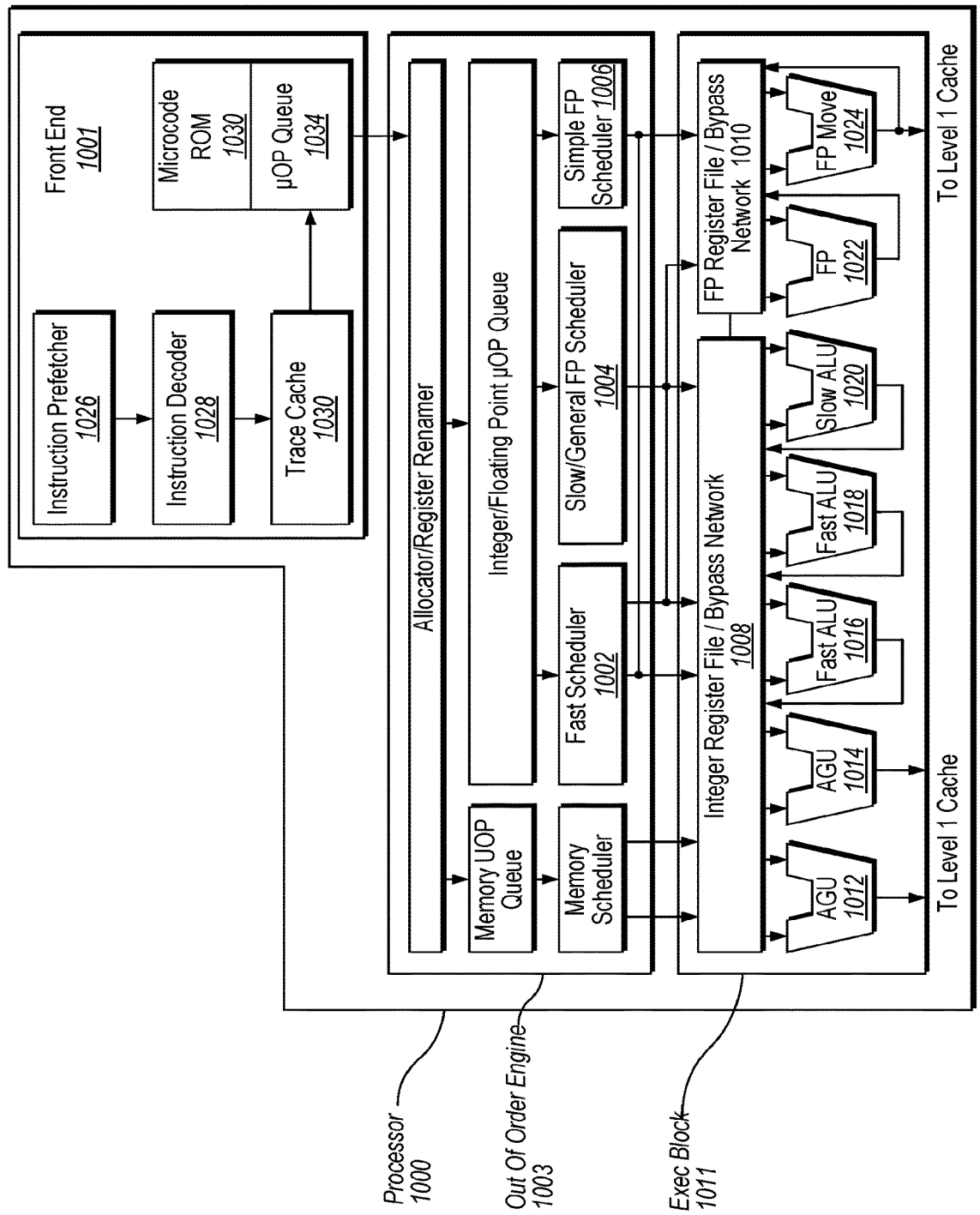
FIG. 10 illustrates a block diagram of the micro-architecture for a processor or an integrated circuit that may implement protection of keys and sensitive data within microprocessor architecture, according to an implementation.

FIG. 10 illustrates a block diagram of the micro-architecture for a processor 1000 that includes logic circuits of a processor or an integrated circuit that may implement protection of keys and sensitive data within microprocessor architecture, according to an implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 1001 is the part of the processor 1000 that fetches instructions to be executed and prepares them to be used later in the processor pipeline. The implementations of the page additions and content copying can be implemented in processor 1000.

The front end 1001 may include several units. In one implementation, the instruction prefetcher 1016 fetches instructions from memory and feeds them to an instruction decoder 1018 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 1030 takes decoded uops and assembles them into program ordered sequences or traces in the uop queue 1034 for execution. When the trace cache 1030 encounters a complex instruction, microcode ROM (or RAM) 1032 provides the uops needed to complete the operation.

Some instructions are converted into a single micro-op, whereas others need several micro-ops to complete the full operation. In one implementation, if more than four micro-ops are needed to complete an instruction, the decoder 1018 accesses the microcode ROM 1032 to do the instruction. For one implementation, an instruction can be decoded into a small number of micro ops for processing at the instruction decoder 1018. In another implementation, an instruction can be stored within the microcode ROM 1032 should a number of micro-ops be needed to accomplish the operation. The trace cache 1030 refers to an entry point programmable logic array (PLA) to determine a correct micro-instruction pointer for reading the micro-code sequences to complete one or more instructions in accordance with one implementation from the micro-code ROM 1032. After the microcode ROM 1032 finishes sequencing micro-ops for an instruction, the front end 1001 of the machine resumes fetching micro-ops from the trace cache 1030.

The out-of-order execution engine 1003 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 1002, slow/general floating point scheduler 1004, and simple floating point scheduler 1006. The uop schedulers 1002, 1004, 1006, determine when a uop is ready to execute based on the readiness of their dependent input register operand sources and the availability of the execution resources the uops need to complete their operation. The fast scheduler 1002 of one implementation can schedule on each half of the main clock cycle while the other schedulers can only schedule once per main processor clock cycle. The schedulers arbitrate for the dispatch ports to schedule uops for execution.

Register sets 1008, 1010, sit between the schedulers 1002, 1004, 1006, and the execution units 1012, 1014, 1016, 1018, 1020, 1022, 1024 in the execution block 1011. There is a separate register set 1008, 1010, for integer and floating point operations, respectively. Each register set 1008, 1010, of one implementation also includes a bypass network that can bypass or forward just completed results that have not yet been written into the register set to new dependent uops. The integer register set 1008 and the floating point register set 1010 are also capable of communicating data with the other. For one implementation, the integer register set 1008 is split into two separate register sets, one register set for the low order 32 bits of data and a second register set for the high order 32 bits of data. The floating point register set 1010 of one implementation has 128 bit wide entries because floating point instructions typically have operands from 64 to 128 bits in width.

The execution block 1011 contains the execution units 1012, 1014, 1016, 1018, 1020, 1022, 1024, where the instructions are actually executed. This section includes the register sets 1008, 1010, that store the integer and floating point data operand values that the micro-instructions need to execute. The processor 1000 of one implementation is comprised of a number of execution units: address generation unit (AGU) 1012, AGU 1014, fast ALU 1016, fast ALU 1018, slow ALU 1020, floating point ALU 1012, floating point move unit 1014. For one implementation, the floating point execution blocks 1012, 1014, execute floating point, MMX, SIMD, and SSE, or other operations. The floating point ALU 1012 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 1016, 1018. The fast ALUs 1016, 1018, of one implementation can execute fast operations with an effective latency of half a clock cycle. For one implementation, most complex integer operations go to the slow ALU 1020 as the slow ALU 1020 includes integer execution hardware for long latency type of operations, such as a multiplier, shifts, flag logic, and branch processing. Memory load/store operations are executed by the AGUs 1022, 1024. For one implementation, the integer ALUs 1016, 1018, 1020, are described in the context of performing integer operations on 64 bit data operands. In alternative implementations, the ALUs 1016, 1018, 1020, can be implemented to support a variety of data bits including 16, 32, 128, 256, etc. Similarly, the floating point units 1022, 1024, can be implemented to support a range of operands having bits of various widths. For one implementation, the floating point units 1022, 1024, can operate on 128 bits wide packed data operands in conjunction with SIMD and multimedia instructions.

In one implementation, the uops schedulers 1002, 1004, 1006, dispatch dependent operations before the parent load has finished executing. As uops are speculatively scheduled and executed in processor 1000, the processor 1000 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, California. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 11:
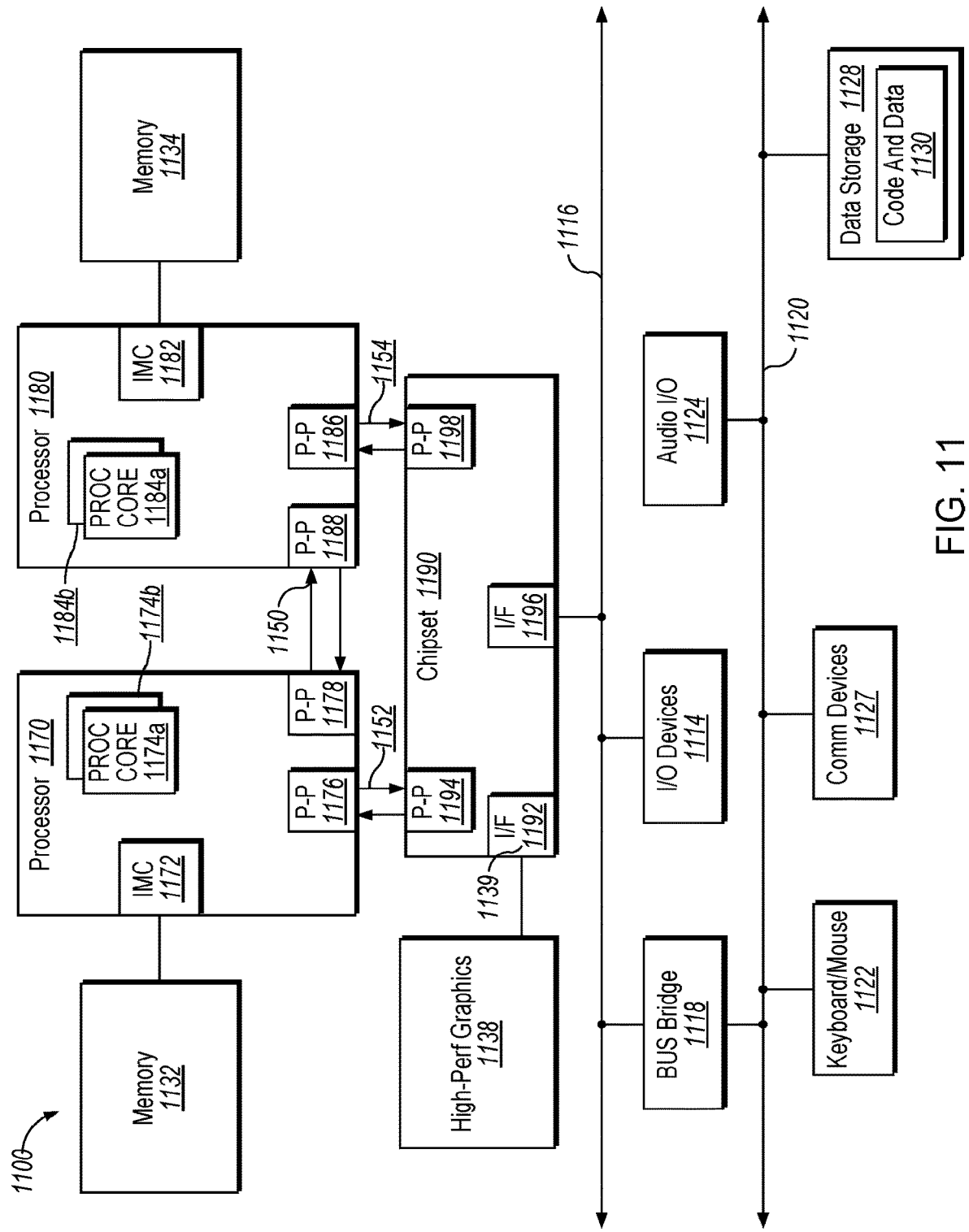
FIG. 11 is a block diagram of a computer system that may implement protection of keys and sensitive data within microprocessor architecture, according to one implementation.

Implementations may be implemented in many different system types. Referring now to FIG. 11, shown is a block diagram of a multiprocessor system 1100 that may implement protection of keys and sensitive data within microprocessor architecture, in accordance with an implementation. As shown in FIG. 11, multiprocessor system 1100 is a point-to-point interconnect system, and includes a first processor 1170 and a second processor 1180 coupled via a point-to-point interconnect 1150. As shown in FIG. 11, each of processors 1170 and 1180 may be multicore processors, including first and second processor cores (i.e., processor cores 1174*a* and 1174*b* and processor cores 1184*a* and 1184*b*), although potentially many more cores may be present in the processors. While shown with two processors 1170, 1180, it is to be understood that the scope of the disclosure is not so limited. In other implementations, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1188; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may exchange information with a chipset 1190 via individual P-P interfaces 1152, 1154 using point to point interface circuits 1176, 1194, 1186, 1198. Chipset 1190 may also exchange information with a high-performance graphics circuit 1138 via a high-performance graphics interface 1139.

Chipset 1190 may be coupled to a first bus 1116 via an interface 1196. In one implementation, first bus 1116 may be a Peripheral Component Interconnect (PCI) bus, or a bus such as a PCI Express bus or interconnect bus, although the scope of the disclosure is not so limited.

Figure 12:
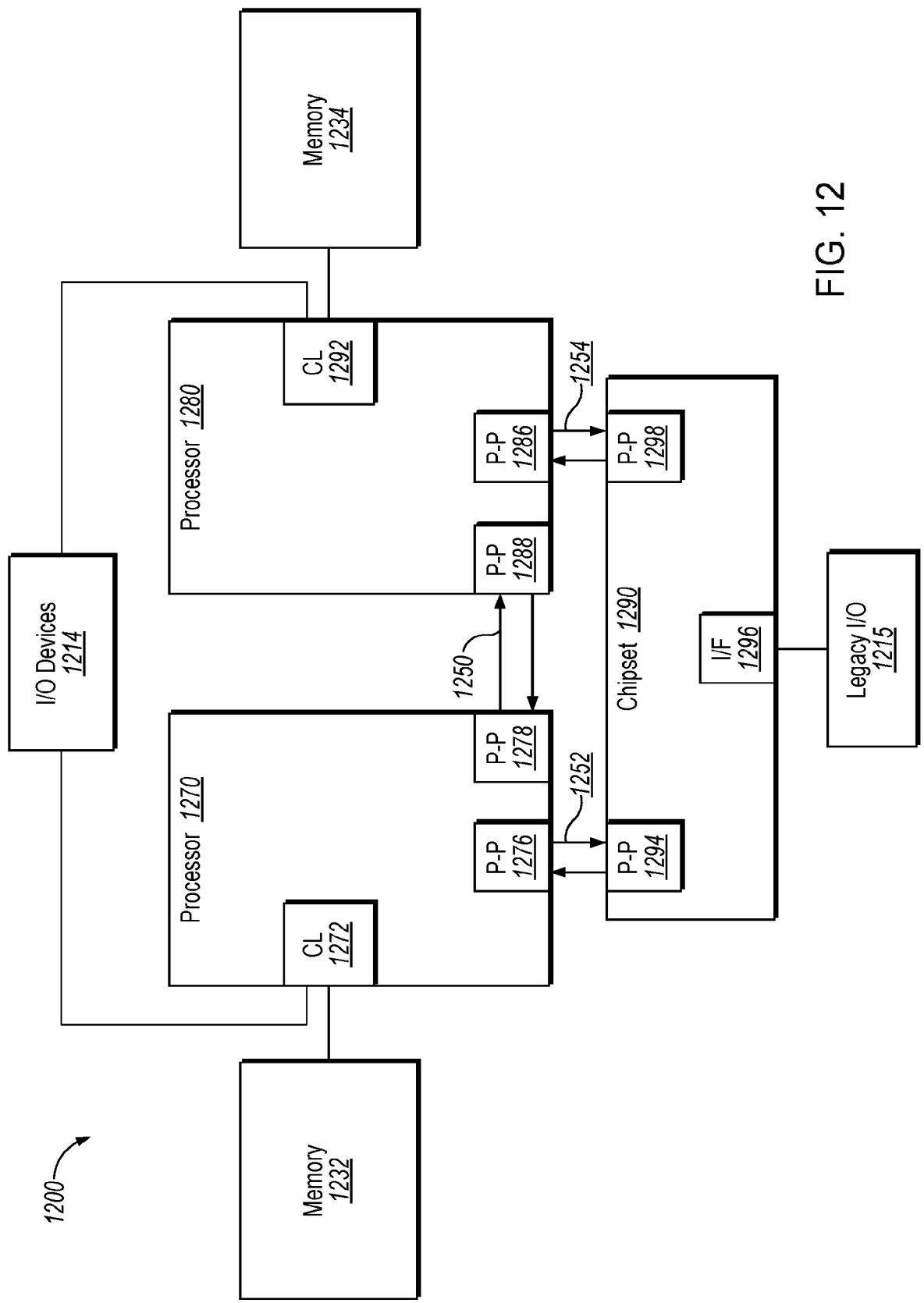
FIG. 12 is a block diagram of a computer system according that may implement protection of keys and sensitive data within microprocessor architecture to another implementation.

Referring now to FIG. 12, shown is a block diagram of a third system 1200 that may implement protection of keys and sensitive data within microprocessor architecture, in accordance with an implementation of the disclosure. Like elements in FIGS. 11 and 12 bear like reference numerals and certain aspects of FIG. 12 have been omitted from FIG. 11 in order to avoid obscuring other aspects of FIG. 12.

FIG. 12 illustrates that the processors 1270, 1280 may include integrated memory and I/O control logic ("CL") 1272 and 1292, respectively. For at least one implementation, the CL 1272, 1282 may include integrated memory controller units such as described herein. In addition. CL 1272, 1292 may also include I/O control logic. FIG. 12 illustrates that the memories 1232, 1234 are coupled to the CL 1272, 1292, and that I/O devices 1214 are also coupled to the control logic 1272, 1292. Legacy I/O devices 1215 are coupled to the chipset 1290.

Figure 13:
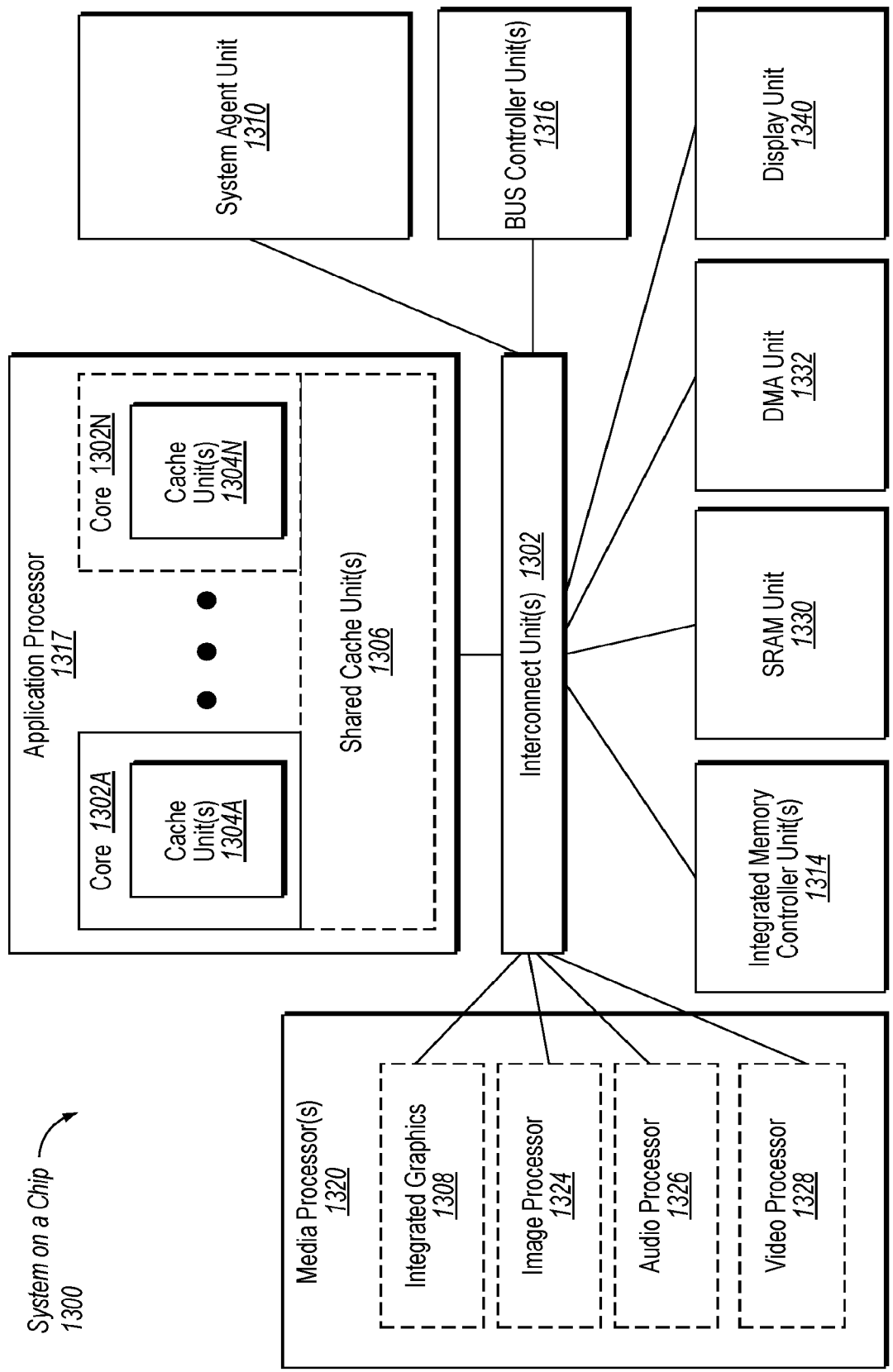
FIG. 13 is a block diagram of a system-on-a-chip (SoC) that may implement protection of keys and sensitive data within microprocessor architecture according to one implementation.

FIG. 13 is an exemplary system on a chip (SoC) 1300 that may include one or more of the cores 1302A . . . 1302N that may implement protection of keys and sensitive data within microprocessor architecture. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1300 of FIG. 13, dashed lined boxes are features on more advanced SoCs. An interconnect unit(s) 1302 may be coupled to: an application processor 1317 which includes a set of one or more cores 1302A-N and shared cache unit(s) 1306; a system agent unit 1310; a bus controller unit(s) 1316; an integrated memory controller unit(s) 1314; a set of one or more media processors 1320 which may include integrated graphics logic 1308, an image processor 1324 for providing still and/or video camera functionality, an audio processor 1326 for providing hardware audio acceleration, and a video processor 1328 for providing video encode/decode acceleration; a static random access memory (SRAM) unit 1330; a direct memory access (DMA) unit 1332; and a display unit 1340 for coupling to one or more external displays.

Figure 14:
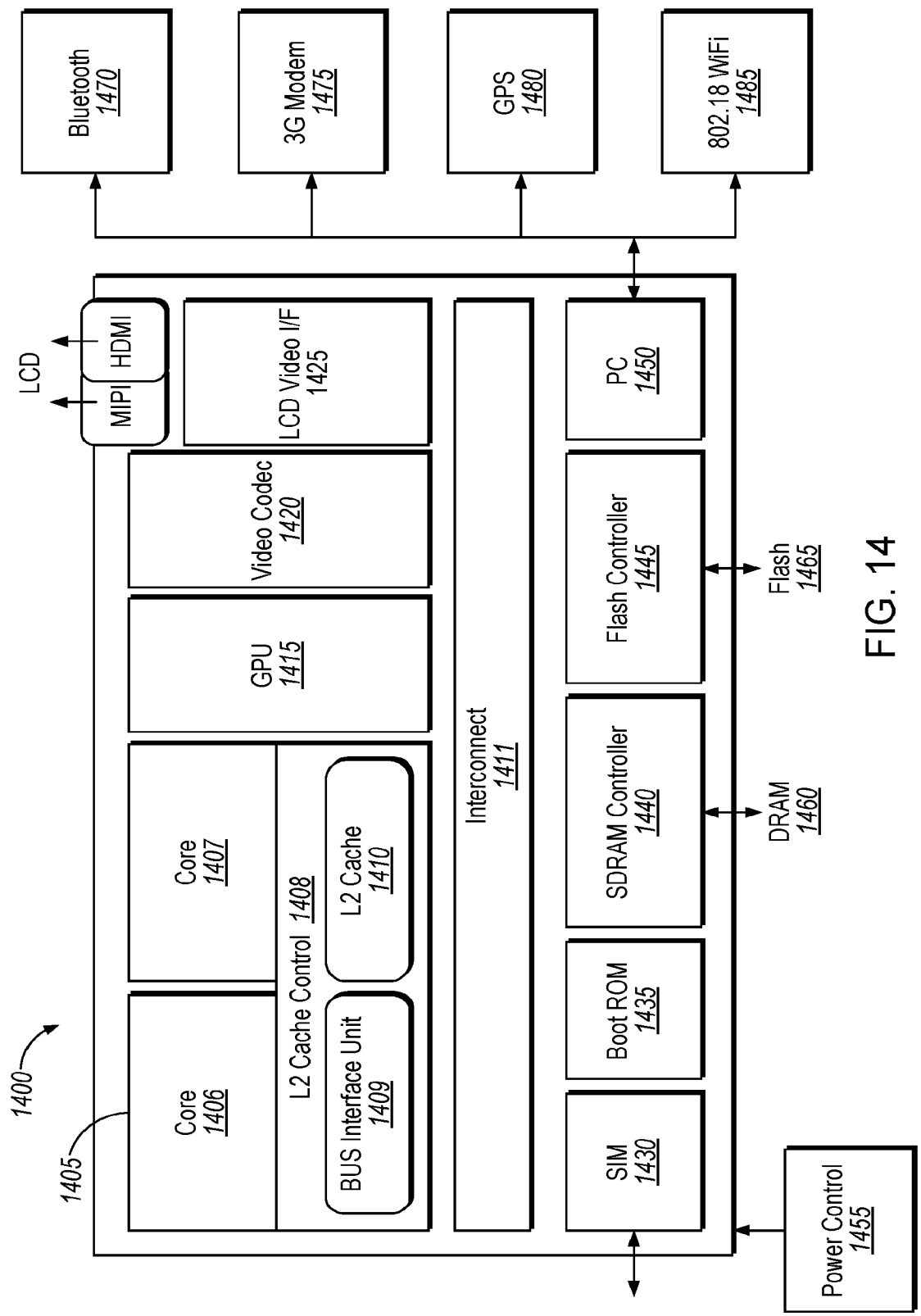
FIG. 14 illustrates another implementation of a block diagram for a computing system that may implement protection of keys and sensitive data within microprocessor architecture according to one implementation.

Turning next to FIG. 14, an implementation of a system on-chip (SoC) design that may implement protection of keys and sensitive data within microprocessor architecture, in accordance with implementations of the disclosure is depicted. As an illustrative example, SoC 1400 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1400.

Here, SoC 1400 includes 2 cores—1406 and 1407. Similar to the discussion above, cores 1406 and 1407 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1406 and 1407 are coupled to cache control 1408 that is associated with bus interface unit 1409 and L2 cache 1410 to communicate with other parts of system 1400. Interconnect 1411 includes an on-chip interconnect, such as an IOSF, AMBA, or other interconnects discussed above, which can implement one or more aspects of the described disclosure.

In one implementation, SDRAM controller 1440 may connect to interconnect 1411 via cache 1410. Interconnect 1411 provides communication channels to the other components, such as a Subscriber Identity Module (SIM) 1430 to interface with a SIM card, a boot ROM 1435 to hold boot code for execution by cores 1406 and 1407 to initialize and boot SoC 1400, a SDRAM controller 1440 to interface with external memory (e.g. DRAM 1460), a flash controller 1445 to interface with non-volatile memory (e.g. Flash 1465), a peripheral control 1450 (e.g. Serial Peripheral Interface) to interface with peripherals, video codecs 1420 and Video interface 1425 to display and receive input (e.g. touch enabled input), GPU 1415 to perform graphics related computations, etc. Any of these interfaces may incorporate aspects of the implementations described herein.

In addition, the system illustrates peripherals for communication, such as a Bluetooth® module 1470, 3G modem 1475, GPS 1480, and Wi-Fi® 1485. Note as stated above, a UE includes a radio for communication. As a result, these peripheral communication modules may not all be included. However, in a UE some form of a radio for external communication should be included.

Figure 15:
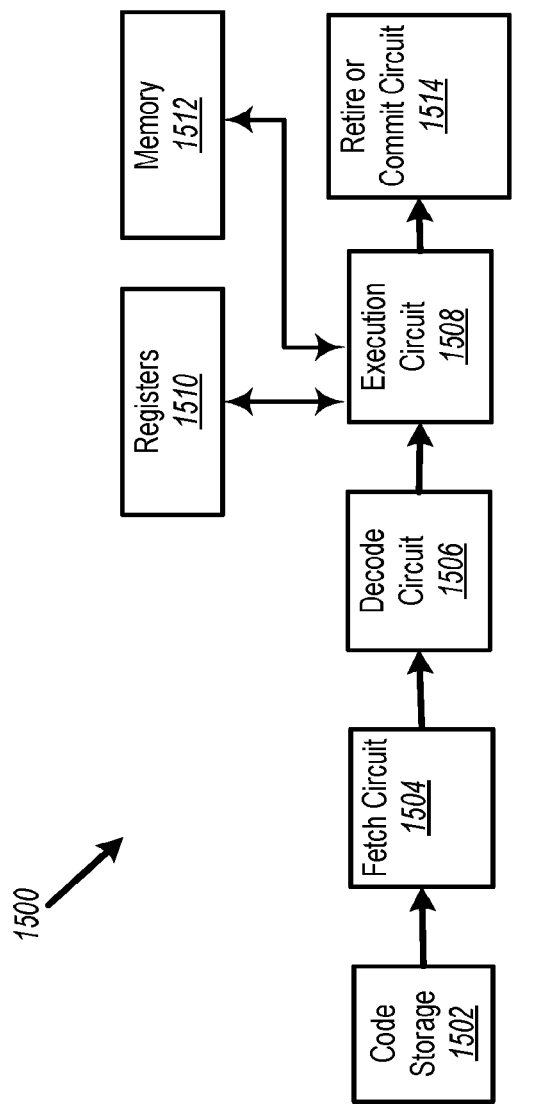
FIG. 15 is a block diagram of processing components for executing instructions that may implement protection of keys and sensitive data within microprocessor architecture, according to one implementation.

FIG. 15 is a block diagram of processing components for executing instructions that may implement protection of keys and sensitive data within microprocessor architecture. As shown, computing system 1500 includes code storage 1502, fetch circuit 1504, decode circuit 1506, execution circuit 1508, registers 1510, memory 1512, and retire or commit circuit 1514. In operation, an instruction (e.g., ENCODEKEY) is to be fetched by fetch circuit 1504 from code storage 1502, which may comprise a cache memory, an on-chip memory, a memory on the same die as the processor, an instruction register, a general register, or system memory, without limitation. In one implementation, the instruction may have a format similar to that of instruction 1700 in FIG. 17. After fetching the instruction from code storage 1502, decode circuit 1506 may decode the fetched instruction, including by parsing the various fields of the instruction. After decoding the fetched instruction, execution circuit 1508 is to execute the decoded instruction. In performing the step of executing the instruction, execution circuit 1508 may read data from and write data to registers 1510 and memory 1512. Registers 1510 may include a data register, an instruction register, a vector register, a mask register, a general register, an on-chip memory, a memory on the same die as the processor, or a memory in the same package as the processor, without limitation. Memory 1512 may include an on-chip memory, a memory on the same die as the processor, a memory in the same package as the processor, a cache memory, or system memory, without limitation. After the execution circuit executes the instruction, retire or commit circuit 1514 may retire the instruction, ensuring that execution results are written to or have been written to their destinations, and freeing up or releasing resources for later use.

Figure 16:
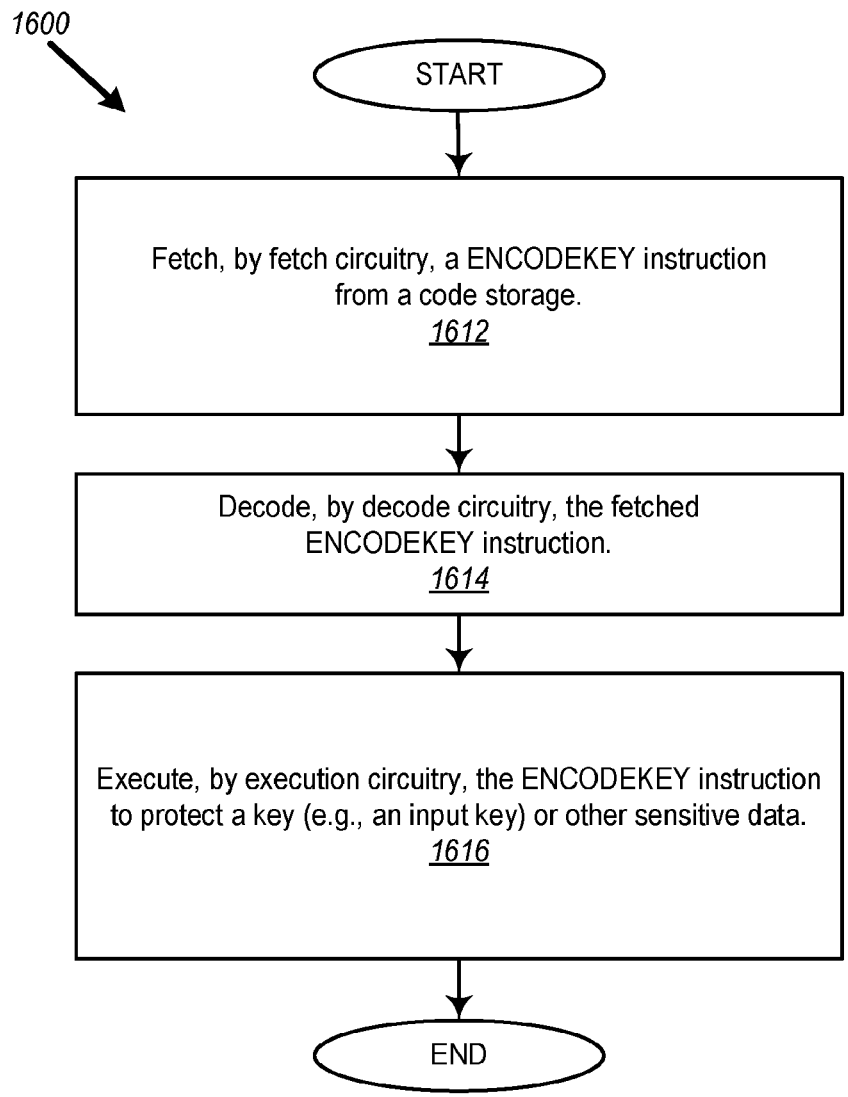
FIG. 16 is a flow diagram of an example method to be performed by a processor to execute an instruction to encode a key handle, according to one implementation.

FIG. 16 is a flow diagram of an example method 1600 to be performed by a processor to execute an instruction to encode a key handle, according to one implementation. After starting the process, a fetch circuit at block 1612 is to fetch the ENCODEKEY instruction from a code storage. At optional block 1614, a decode circuit may decode the fetched ENCODEKEY instruction. At block 1616, an execution circuit is to execute the ENCODEKEY instruction to encode or encrypt a key and an authorization token within the key handle.

The ENCODEKEY instruction may be a cryptographic instruction adapted for interaction with other cryptographic instructions. For example, the ENCODEKEY instruction may retrieve a key that has been loaded or retrieved by another cryptographic instruction and/or generate or retrieve a token that has been generated or provided by another cryptographic instruction. The ENCODEKEY instruction may also be adapted to apply a tweak to encryption of the key handle using a value provided by a monotonic counter or a variant of an authorization token, in various embodiments. Furthermore, a further cryptographic instruction may process the key handle that is the output or result of execution of the ENCODEKEY instruction, as described previously when triggered by a software program that is to access protected data that is encrypted with the key that is encoded within the key handle. That further cryptographic instruction may be associated with a logical compartment of a software program, facilitating the compartmentalization of authorized access to the key encoded within the key handle.

Figure 17:
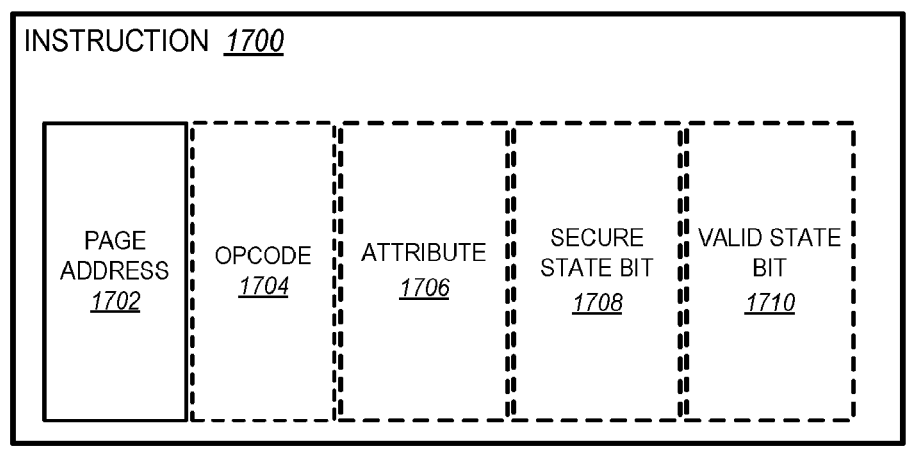
FIG. 17 is a block diagram illustrating an example format for instructions disclosed herein.

FIG. 17 is a block diagram illustrating an example format for instructions 1700 disclosed herein that implement hardware support for a multi-key cryptographic engine. The instruction 1700 may be ENCODEKEY. The parameters in the format of the instruction 1700 may be different for ENCODEKEY. As such, some of the parameters are depicted as optional with dashed lines. As shown, instruction 1400 includes a page address 1702, optional opcode 1704, optional attribute 1706, optional secure state bit 1708, and optional valid state bit 1710. Other or additional opcodes and state bits are envisioned.

Figure 18:
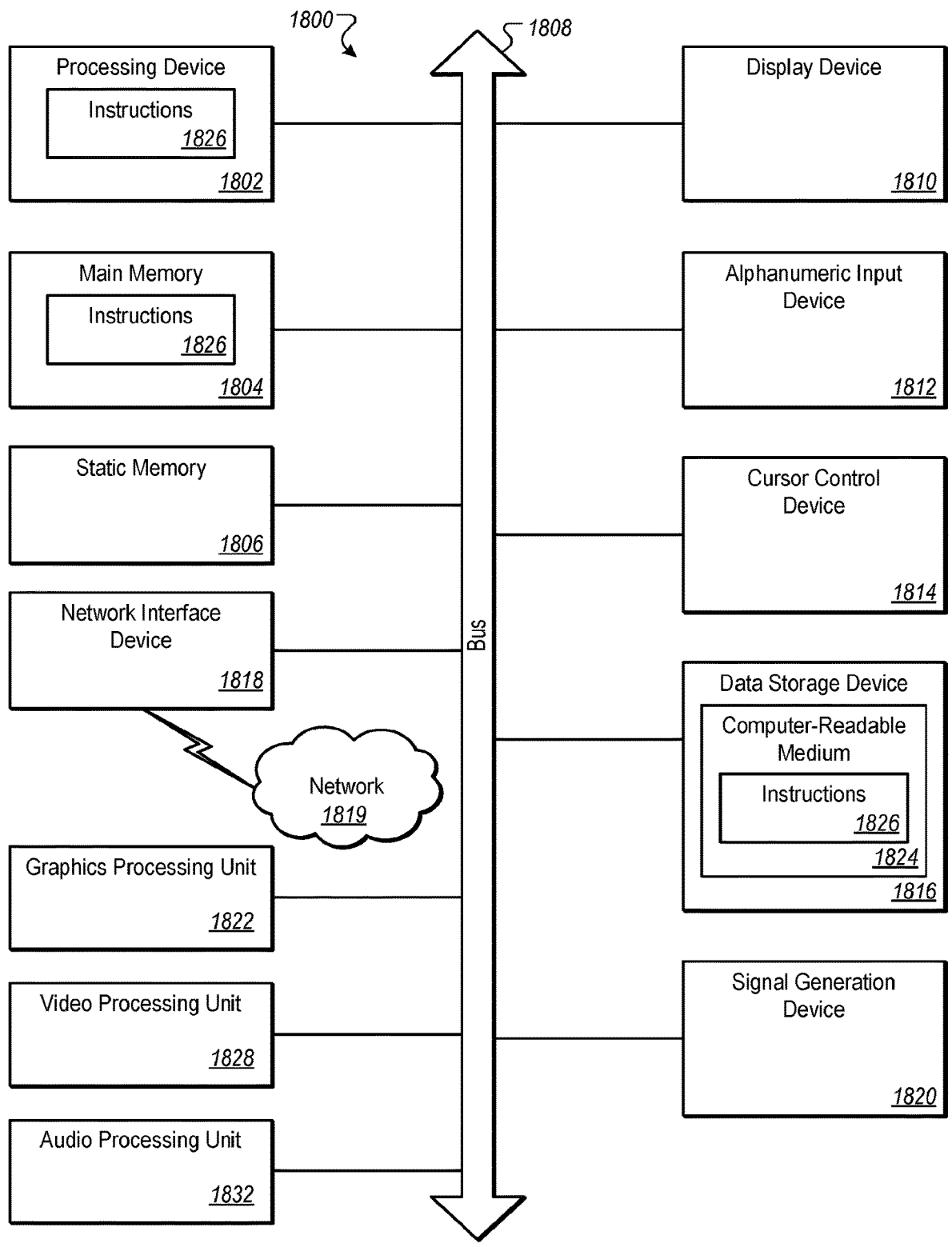
FIG. 18 illustrates another implementation of a block diagram for a computing system that may implement protection of keys and sensitive data within microprocessor architecture according to one implementation.

FIG. 18 illustrates a diagrammatic representation of a machine in the example form of a computing system 1800 within which a set of instructions, for causing the machine to implement protection of keys and sensitive data within microprocessor architecture according any one or more of the methodologies discussed herein. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the page additions and content copying can be implemented in computing system 1800.

The computing system 1800 includes a processing device 1802, main memory 1804 (e.g., flash memory, dynamic random access memory (DRAM) (such as synchronous DRAM (SDRAM) or DRAM (RDRAM), etc.), a static memory 1806 (e.g., flash memory, static random access memory (SRAM), etc.), and a data storage device 1816, which communicate with each other via a bus 1808.

Processing device 1802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1802 may also be one or more special-purpose processing devices such as an application-specific integrated circuit (ASIC), a field programmable gate array (FPGA), a digital signal processor (DSP), network processor, or the like. In one implementation, processing device 1802 may include one or more processor cores. The processing device 1802 is configured to execute the processing logic 1826 for performing the operations discussed herein.

In one implementation, processing device 1802 can be part of a processor or an integrated circuit that includes the disclosed LLC caching architecture. Alternatively, the computing system 1800 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1800 may further include a network interface device 1818 communicably coupled to a network 1819. The computing system 1800 also may include a video display device 1810 (e.g., a liquid crystal display (LCD) or a cathode ray tube (CRT)), an alphanumeric input device 1812 (e.g., a keyboard), a cursor control device 1814 (e.g., a mouse), a signal generation device 1820 (e.g., a speaker), or other peripheral devices. Furthermore, computing system 1800 may include a graphics processing unit 1822, a video processing unit 1828 and an audio processing unit 1832. In another implementation, the computing system 1800 may include a chipset (not illustrated), which refers to a group of integrated circuits, or chips, that are designed to work with the processing device 1802 and controls communications between the processing device 1802 and external devices. For example, the chipset may be a set of chips on a motherboard that links the processing device 1802 to very high-speed devices, such as main memory 1804 and graphic controllers, as well as linking the processing device 1802 to lower-speed peripheral buses of peripherals, such as USB, PCI or ISA buses.

The data storage device 1816 may include a computer-readable storage medium 1824 on which is stored software 1826 embodying any one or more of the methodologies of functions described herein. The software 1826 may also reside, completely or at least partially, within the main memory 1804 as instructions 1826 and/or within the processing device 1802 as processing logic during execution thereof by the computing system 1800; the main memory 1804 and the processing device 1802 also constituting computer-readable storage media.

The computer-readable storage medium 1824 may also be used to store instructions 1826 utilizing the processing device 1802, and/or a software library containing methods that call the above applications. While the computer-readable storage medium 1824 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is processor comprising: 1) a token generator circuit; and 2) a processor core that includes the token generator circuit, wherein the processor core is to execute a first instruction in response to initialization of a software program that requests access to protected data output by a cryptographic operation, wherein to execute the first instruction, the processor core is to: a) retrieve a key that is to be used by the cryptographic operation; b) trigger the token generator circuit to generate an authorization token; c) cryptographically encode the key and the authorization token within a key handle; d) store the key handle in memory; and e) embed the authorization token within a cryptographic instruction that is to perform the cryptographic operation, the cryptographic instruction associated with a first logical compartment of the software program that is authorized access to the protected data.

In Example 2, the processor of Example 1, wherein the processor core is further to, in response to execution of the cryptographic instruction: a) retrieve the key handle from the memory; b) decrypt the key handle to extract the authorization token and the key; c) match the authorization token from the key handle to the authorization token embedded in the cryptographic instruction to authenticate the key handle; and d) perform the cryptographic operation using the key to generate the protected data.

In Example 3, the processor of Example 2, wherein the processor core is further to at least one of: a) prohibit use of user-mode threading during execution of the cryptographic operation; b) encrypt a thread state and data from spilled registers that are stored to user mode memory; or c) defer preemption of execution to the user-mode threading during execution of the cryptographic operation.

In Example 4, the processor of Example 1, wherein, to embed the authorization token within the cryptographic instruction, the processor core is to store the authorization token as one of a register operand or an immediate operand within the cryptographic instruction.

In Example 5, the processor of Example 1, wherein the processor core is further to mark the cryptographic instruction as execute-only status in memory permissions associated with a location in memory where the cryptographic instruction is stored.

In Example 6, the processor of Example 1, wherein the first logical compartment comprises a collection of first code and first data that the first code is authorized to access, and wherein the processor core is further to: a) assign the authorization token to the first logical compartment; b) assign a second authorization token to a second logical compartment, wherein the second logical compartment comprises second code and second data that the second code is authorized to access, the second data being different than the first data; and c) block access to the authorization token by the second code of the second logical compartment.

In Example 7, the processor of Example 1, wherein the cryptographic operation is associated with the first logical compartment, a second cryptographic operation is associated with a second logical compartment, and wherein the processor core is further to: a) assign the authorization token to a first data type that is accessible by the first logical compartment but not by the second logical compartment; b) assign a second authorization token to a second data type that is accessible by the second logical compartment but not by the first logical compartment; and c) block access to the authorization token by second code of the second logical compartment.

In Example 8, the processor of Example 7, wherein the processor core is further to, in response to initialization of the software program that includes the second cryptographic operation: a) cryptographically encode the key and the second authorization token within a second key handle; b) store the second key handle in a second storage location of the processor core; and c) embed the second authorization token within a second cryptographic instruction, wherein the second cryptographic instruction is to call for the execution of the second cryptographic operation during runtime of the software program.

Various implementations may have different combinations of the structural features described above. For instance, all optional features of the processors and methods described above may also be implemented with respect to a system described herein and specifics in the examples may be used anywhere in one or more implementations.

Example 9 is a system comprising: 1) a memory; and 2) a processor core that is coupled to the memory, wherein the processor core is to execute a first instruction in response to initialization of a software program that requests access to protected data output by a cryptographic operation, wherein to execute the first instruction, the processor core is to: a) retrieve a key that is to be used by the cryptographic operation; b) generate an authorization token with use of a random number generator; c) encrypt the key and the authorization token within a key handle; d) store the key handle in the memory; and e) embed the authorization token within a cryptographic instruction that is to perform the cryptographic operation, the cryptographic instruction associated with a first logical compartment of the software program that is authorized access to the protected data; and wherein the processor core is further to, in response to execution of the cryptographic instruction within a first thread, perform the cryptographic operation to: f) encrypt plaintext intermediate data that contains sensitive data to generate encrypted data; and g) write the encrypted data to the memory to protect the sensitive data from access by at least a second thread currently in execution by the processor core.

In Example 10, the system of Example 9, wherein the cryptographic operation is decryption, and wherein the processor core is further to, in response to execution of the cryptographic instruction: a) retrieve the key handle from the memory; b) decrypt the key handle to extract the authorization token and the key; c) match the authorization token from the key handle to the authorization token embedded in the cryptographic instruction to authenticate the key handle; and c) perform the decryption using the key to generate the protected data.

In Example 11, the system of Example 9, wherein the processor core further comprises a set of monotonic counters, and to encrypt a memory block that contains one of the key handle or the plaintext intermediate data, the processor core is further to: a) increment a value of a monotonic counter, of the set of monotonic counters, which is associated with a base address in the memory for the memory block; and b) apply a tweak, using both the base address in the memory for the memory block and the value of the monotonic counter, to encrypt the memory block.

In Example 12, the system of Example 11, wherein to decrypt the memory block, the processor core is further to: a) read the value from the monotonic counter; b) use both the base address in the memory for the memory block and the value of the monotonic counter as a tweak to decrypt the memory block; and c) increment the value of the monotonic counter.

In Example 13, the system of Example 9, wherein to encrypt the key and the authorization token within the key handle, the processor core is to: a) employ a processor key to encrypt the key and the authorization token within the key handle for use during a first processing session, wherein the key handle is a first key handle; and b) in response to completion of the first processing session, employ a second processor key to encrypt the key and the authorization token within a second key handle associated with a second processing session.

In Example 14, the system of Example 9, wherein the processor core includes a set of monotonic counters, and wherein to execute the first instruction, the processor core is further to: a) increment a value of a monotonic counter of the set of monotonic counters, wherein the value is associated with a first processing session of the software program; b) employ the value as a tweak to encrypt the key and the authorization token within the key handle; c) in response to execution of the cryptographic instruction, decrypt the key handle, using the value as the tweak, to extract the key and the authorization token; and d) in response to completion of the first processing session, increment the value of the monotonic counter to invalidate further use of the key handle during a second processing session.

In Example 15, the system of Example 9, wherein to cryptographically encode the key and the authorization token within the key handle, the processor core is to: a) determine a type of data to be processed by the cryptographic operation; b) embed a type specifier associated with the data type within one of a register operand or an immediate operand of the cryptographic instruction; and in response to execution of the cryptographic instruction, the processor core is further to: c) determine the type of data to be processed based on the type specifier; d) process, by the cryptographic operation, second data that is of the type of data; and e) not process, with the cryptographic operation, third data that is not of the type of data.

Various implementations may have different combinations of the structural features described above. For instance, all optional features of the processors and methods described above may also be implemented with respect to a system described herein and specifics in the examples may be used anywhere in one or more implementations.

Example 16 is a method comprising: a) retrieving, by a processor core in response to initialization of a software program that requests access to protected data output by a cryptographic operation, a key that is to be used by the cryptographic operation; b) cryptographically encoding, by the processor core, the key and a fixed code location within a key handle, wherein the fixed code location is a location in memory from which a cryptographic instruction is to execute to perform the cryptographic operation, wherein the cryptographic instruction is associated with a first logical compartment of the software program; and c) storing, by the processor core, the key handle in memory for use during execution of the cryptographic operation.

In Example 17, the method of Example 16, further comprising, in response to a request to execute the cryptographic instruction: a) retrieving the key handle from the memory; b) decrypting the key handle to extract the fixed code location and the key; c) matching a code location, from where the cryptographic instruction executes, to the fixed code location from the key handle; and d) performing the cryptographic operation using the key to generate the protected data.

In Example 18, the method of Example 17, further comprising at least one of: a) prohibiting use of user-mode threading during execution of the cryptographic operation; b) encrypting a thread state and data from spilled registers that are stored to user mode memory; or c) deferring preemption of execution to the user-mode threading during execution of the cryptographic operation.

In Example 19, the method of Example 17, wherein the cryptographic operation is decryption of sensitive cipher text data, the method further comprising decrypting, by the software program using the key, the sensitive cipher text data to generate plaintext data.

In Example 20, the method of Example 16, further comprising, in response to a request to execute the cryptographic instruction: a) retrieving the key handle from the memory; b) decrypting the key handle to extract the fixed code location and the key; c) determining that a code location, from where a second cryptographic instruction executes, does not match the fixed code location from the key handle; and d) denying access to the key by the second cryptographic instruction, which is associated with a second logical compartment of the software program.

Various implementations may have different combinations of the structural features described above. For instance, all optional features of the processors and methods described above may also be implemented with respect to a system described herein and specifics in the examples may be used anywhere in one or more implementations.

Example 21 is non-transitory computer-readable storage medium comprising instructions, which when executed, cause a processor core to perform a plurality of operations comprising: a) executing a first instruction in response to initialization of a software program that requests access to protected data output by a cryptographic operation, wherein to execute the first instruction, the processor core is to perform operations comprising: b) retrieving a key that is to be used by the cryptographic operation; b) triggering the token generator circuit to generate an authorization token; c) cryptographically encoding the key and the authorization token within a key handle; d) storing the key handle in memory; and e) embedding the authorization token within a cryptographic instruction that is to perform the cryptographic operation, the cryptographic instruction associated with a first logical compartment of the software program that is authorized access to the protected data.

In Example 22, the non-transitory computer-readable storage medium of Example 21, wherein in response to execution of the cryptographic instruction, the plurality of operations comprises: a) retrieving the key handle from the memory; b) decrypt the key handle to extract the authorization token and the key; c) matching the authorization token from the key handle to the authorization token embedded in the cryptographic instruction to authenticate the key handle; and d) performing the cryptographic operation using the key to generate the protected data.

In Example 23, the non-transitory computer-readable storage medium of Example 22, wherein the plurality of operations includes at least one of: a) prohibiting use of user-mode threading during execution of the cryptographic operation; b) encrypting a thread state and data from spilled registers that are stored to user mode memory; or c) deferring preemption of execution to the user-mode threading during execution of the cryptographic operation.

In Example 24, the non-transitory computer-readable storage medium of Example 21, wherein, embedding the authorization token within the cryptographic instruction comprises storing the authorization token as one of a register operand or an immediate operand within the cryptographic instruction.

In Example 25, the non-transitory computer-readable storage medium of Example 21, wherein the plurality of operations further comprises marking the cryptographic instruction as execute-only status in memory permissions associated with a location in memory where the cryptographic instruction is stored.

In Example 26, the non-transitory computer-readable storage medium of Example 21, wherein the first logical compartment comprises a collection of first code and first data that the first code is authorized to access, and wherein the plurality of operations further comprises: a) assigning the authorization token to the first logical compartment; b) assigning a second authorization token to a second logical compartment, wherein the second logical compartment comprises second code and second data that the second code is authorized to access, the second data being different than the first data; and c) blocking access to the authorization token by the second code of the second logical compartment.

In Example 27, the non-transitory computer-readable storage medium of Example 21, wherein the cryptographic operation is associated with the first logical compartment, a second cryptographic operation is associated with a second logical compartment, and wherein the plurality of operations further comprises: a) assigning the authorization token to a first data type that is accessible by the first logical compartment but not by the second logical compartment; b) assigning a second authorization token to a second data type that is accessible by the second logical compartment but not by the first logical compartment; and c) blocking access to the authorization token by second code of the second logical compartment.

In Example 28, the non-transitory computer-readable storage medium of Example 27, wherein in response to initialization of the software program that includes the second cryptographic operation, the plurality of operations further comprises: a) cryptographically encoding the key and the second authorization token within a second key handle; b) storing the second key handle in a second storage location of the processor core; and c) embedding the second authorization token within a second cryptographic instruction, wherein the second cryptographic instruction is to call for the execution of the second cryptographic operation during runtime of the software program.

Various implementations may have different combinations of the structural features described above. For instance, all optional features of the processors and methods described above may also be implemented with respect to a system described herein and specifics in the examples may be used anywhere in one or more implementations.

Example 29 is a system comprising: 1) means for retrieving, by a processor core in response to initialization of a software program that requests access to protected data output by a cryptographic operation, a key that is to be used by the cryptographic operation; 2) means for cryptographically encoding, by the processor core, the key and a fixed code location within a key handle, wherein the fixed code location is a location in memory from which a cryptographic instruction is to execute to perform the cryptographic operation, wherein the cryptographic instruction is associated with a first logical compartment of the software program; and 3) storing, by the processor core, the key handle in memory for use during execution of the cryptographic operation.

In Example 30, the system of Example 26, further comprising, in response to a request to execute the cryptographic instruction: 1) means for retrieving the key handle from the memory; 2) means for decrypting the key handle to extract the fixed code location and the key; 3) means for matching a code location, from where the cryptographic instruction executes, to the fixed code location from the key handle; and 4) means for performing the cryptographic operation using the key to generate the protected data.

In Example 31, the system of Example 30, further comprising at least one of: 1) means for prohibiting use of user-mode threading during execution of the cryptographic operation; 2) means for encrypting a thread state and data from spilled registers that are stored to user mode memory; or 3) means for deferring preemption of execution to the user-mode threading during execution of the cryptographic operation.

In Example 32, the system of Example 30, wherein the cryptographic operation is decryption of sensitive cipher text data, the system further comprising 1) means for decrypting, by the software program using the key, the sensitive cipher text data to generate plaintext data.

In Example 33, the system of Example 29, further comprising, in response to a request to execute the cryptographic instruction: 1) means for retrieving the key handle from the memory; 2) means for decrypting the key handle to extract the fixed code location and the key; 3) means for determining that a code location, from where a second cryptographic instruction executes, does not match the fixed code location from the key handle; and 4) means for denying access to the key by the second cryptographic instruction, which is associated with a second logical compartment of the software program.

While the disclosure has been described with respect to a limited number of implementations, those skilled in the art will appreciate numerous modifications and variations there-from. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the disclosure.

The implementations are described with reference to determining validity of data in cache lines of a sector-based cache in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the above examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' 'capable to,' or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. An apparatus comprising:
   a memory comprising a software program, the software program comprising a first code portion with authorization to access protected data and a second code portion without authorization to access the protected data, the first code portion associated with a cryptographic instruction, the cryptographic instruction to perform a cryptographic operation that outputs the protected data; and
   a processor core to execute a first instruction in response to initialization of the software program, wherein to execute the first instruction, the processor core is to:
      cryptographically encode a key and authorization information within a key handle, the authorization information associated with the first code portion and not associated with the second code portion; and
      store the key handle in the memory, wherein the processor core is further to mark the cryptographic instruction as execute-only status in memory permissions associated with a location in the memory where the cryptographic instruction is stored.

2. The apparatus of claim 1, the authorization information comprising an authorization token, and wherein the processor core is further to embed the authorization token within the cryptographic instruction.

3. The apparatus of claim 2, wherein, to embed the authorization token within the cryptographic instruction, the processor core is to store the authorization token as one of a register operand or an immediate operand within the cryptographic instruction.

4. The apparatus of claim 1, the authorization information comprising a code location in the first code portion with authorization to access the protected data, wherein the code location is a location in the memory from which the cryptographic instruction is to execute to perform the cryptographic operation that outputs the protected data.

5. The apparatus of claim 1, wherein the processor core is further to, in response to execution of the cryptographic instruction:
   decrypt the key handle to extract the authorization information and the key;
   determine the cryptographic instruction is authorized to use the key handle based on the authorization information; and
   perform the cryptographic operation using the key to generate the protected data, wherein to perform the cryptographic operation using the key to generate the protected data comprises:

encrypting plaintext intermediate data using the key, the plaintext intermediate data comprising sensitive data, and writing the protected data to the memory to protect the protected data from being accessed by a concurrently executing thread different than a thread executing the cryptographic instruction.

6. The apparatus of claim 1, wherein the first code portion comprises a collection of first code and first data that the first code is authorized to access, and wherein the processor core is further to:

assign the authorization information to the first code portion;

assign a second authorization information to the second code portion, wherein the second code portion comprises second code and second data that the second code is authorized to access, the second data being different than the first data; and block access to the authorization information by the second code of the second code portion.

7. A processor to execute a key encode instruction, the processor comprising:

fetch circuitry to fetch, from code storage, the key encode instruction having fields to specify an opcode, a first source register comprising an input key, a second source register comprising authorization information, and a destination register comprising a key handle;

decode circuitry to decode the key encode instruction;

and execution circuitry, responsive to the key encode instruction, to:

cryptographically encode the input key and the authorization information within the key handle, the authorization information associated with a portion of a software program, wherein the portion has authorized access to protected data, wherein the key handle is unique to the input key and to one processor core of the processor.

8. The processor of claim 7, the key encode instruction further comprising a field to specify a processor key of a plurality of processor keys, and wherein the execution circuitry, responsive to the key encode instruction, is further to encrypt the key handle using the processor key.

9. The processor of claim 7, the input key comprising data to be protected using encryption and the key handle comprising a result of an encryption operation.

10. The processor of claim 7, wherein in response to execution of a cryptographic instruction, the processor is further to:

decrypt the key handle to extract the authorization information and the input key;

determine the cryptographic instruction is authorized to use the key handle based on the authorization information; and perform a cryptographic operation using the input key to generate protected data to which access has been requested by the software program.

11. The processor of claim 10, the authorization information comprising an authorization token, and wherein the processor is further to embed the authorization token within the cryptographic instruction.

12. The processor of claim 11, wherein to embed the authorization token within the cryptographic instruction, the processor is to store the authorization token as one of a register operand or an immediate operand within the cryptographic instruction.

13. The processor of claim 10, the authorization information comprising a code location in the portion of the software program, wherein the code location is a location from which the cryptographic instruction is to execute to perform the cryptographic operation that outputs the protected data.

14. The processor of claim 10, the authorization information comprising a type specifier associated with a data type within an operand of the cryptographic instruction, a base address in memory for a memory block storing the protected data, or a value of a monotonic counter associated with the base address in the memory.

15. A non-transitory machine-readable medium storing instructions which, when executed by a processor, cause the processor to perform operations comprising:

cryptographically encoding an input key and authorization information within a key handle, the authorization information associated with a first portion of a software program, the first portion having authorized access to protected data and a second portion of the software program not authorized access to the protected data; and storing the key handle, wherein in response to execution of a cryptographic instruction, the instructions, when executed by the processor, further cause the processor to perform operations comprising:

decrypting the key handle to extract the authorization information and the input key;

determine the cryptographic instruction is authorized to use the key handle based on the authorization information; and perform a cryptographic operation using the input key to generate the protected data to which access has been requested by the software program.

16. The non-transitory machine-readable medium of claim 15, the authorization information comprising an authorization token, and wherein the processor is further to embed the authorization token within the cryptographic instruction.

17. The non-transitory machine-readable medium of claim 15, the authorization information comprising a code location in the first portion of the software program, wherein the code location is a location from which the cryptographic instruction is to execute to perform the cryptographic operation that outputs the protected data.

* * * * *